(12) United States Patent
Cho et al.

(10) Patent No.: US 10,681,637 B2
(45) Date of Patent: Jun. 9, 2020

(54) METHOD AND APPARATUS FOR TRANSMITTING AND RECEIVING DATA, BY TERMINAL, IN WIRELESS COMMUNICATION SYSTEM

(71) Applicant: LG ELECTRONICS INC., Seoul (KR)

(72) Inventors: Heejeong Cho, Seoul (KR); Genebeck Hahn, Seoul (KR); Eunjong Lee, Seoul (KR); Ilmu Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/741,972

(22) PCT Filed: Jul. 15, 2015

(86) PCT No.: PCT/KR2015/007365
§ 371 (c)(1),
(2) Date: Jan. 4, 2018

(87) PCT Pub. No.: WO2017/010589
PCT Pub. Date: Jan. 19, 2017

(65) Prior Publication Data
US 2018/0199288 A1 Jul. 12, 2018

(51) Int. Cl.
*H04W 52/02* (2009.01)
*H04W 76/20* (2018.01)
(Continued)

(52) U.S. Cl.
CPC ......... *H04W 52/0229* (2013.01); *H04W 8/02* (2013.01); *H04W 72/04* (2013.01);
(Continued)

(58) Field of Classification Search
CPC ....... H04W 72/04; H04W 76/20; H04W 8/02; H04W 76/10
See application file for complete search history.

(56) References Cited

U.S. PATENT DOCUMENTS

2013/0229931 A1* 9/2013 Kim .................. H04W 48/08 370/252
2014/0293796 A1* 10/2014 Jeong ................ H04M 15/66 370/236

(Continued)

FOREIGN PATENT DOCUMENTS

EP 2950565 A1 12/2015
KR 10-2009-0037937 A 4/2009
(Continued)

OTHER PUBLICATIONS

Nokia Networks, "Optimizations for the IDLE to CONNECTED state transition", R2-152193, 3GPP TSG-RAN WG2 Meeting #90, Fukuoka, Japan, May 25-29, 2015, See Sections 1-2; Annex B; and Figure 1.

(Continued)

*Primary Examiner* — Khaled M Kassim
*Assistant Examiner* — Syed Ali
(74) *Attorney, Agent, or Firm* — Dentons US LLP

(57) ABSTRACT

The present invention relates to a method and an apparatus for transmitting and receiving data in a wireless communication system which supports a low latency service. According to the present invention, a method and an apparatus are provided, wherein a terminal transmits a request message to a base station for converting from an idle state to a connected state; receives, from the base station, a response message including the resource information associated with the transmission and reception of low latency service data, in response to the request message; and transmits and receives the low latency service data using an allocated resource. Thereafter, when additional data is generated, the terminal converts from an idle state to a connected state and transmits and receives the additional data.

16 Claims, 33 Drawing Sheets

(51) Int. Cl.
    *H04W 72/04*     (2009.01)
    *H04W 76/10*     (2018.01)
    *H04W 8/02*     (2009.01)
    *H04W 12/08*     (2009.01)

(52) U.S. Cl.
    CPC ........... *H04W 76/10* (2018.02); *H04W 76/20* (2018.02); *H04W 12/08* (2013.01); *H04W 72/0413* (2013.01); *Y02D 70/00* (2018.01); *Y02D 70/10* (2018.01); *Y02D 70/12* (2018.01); *Y02D 70/122* (2018.01); *Y02D 70/126* (2018.01); *Y02D 70/1224* (2018.01); *Y02D 70/1226* (2018.01); *Y02D 70/1242* (2018.01); *Y02D 70/1262* (2018.01); *Y02D 70/1264* (2018.01); *Y02D 70/14* (2018.01); *Y02D 70/142* (2018.01); *Y02D 70/146* (2018.01); *Y02D 70/20* (2018.01); *Y02D 70/21* (2018.01); *Y02D 70/22* (2018.01); *Y02D 70/24* (2018.01)

(56) References Cited

U.S. PATENT DOCUMENTS

| | | | | |
|---|---|---|---|---|
| 2015/0327312 A1* | 11/2015 | Burbidge | ............. | H04W 72/14 370/329 |
| 2016/0057730 A1* | 2/2016 | Truelove | ............... | H04W 68/04 455/434 |
| 2016/0105917 A1* | 4/2016 | Miao | .................... | H04W 76/10 370/329 |
| 2016/0205661 A1* | 7/2016 | Ryu | ....................... | H04W 36/30 455/458 |
| 2016/0219475 A1* | 7/2016 | Kim | .......................... | H04L 5/00 |
| 2016/0309448 A1* | 10/2016 | Truelove | ................. | H04W 8/22 |
| 2017/0251353 A1* | 8/2017 | Pinheiro | ............... | H04W 76/14 |
| 2017/0265241 A1* | 9/2017 | Fujishiro | ............... | H04W 48/08 |
| 2017/0325150 A1* | 11/2017 | Mitsui | ................... | H04W 36/26 |
| 2018/0020431 A1* | 1/2018 | Cho | ............ | H04W 72/042 |
| 2018/0146410 A1* | 5/2018 | Cho | ............... | H04W 48/20 |
| 2018/0249367 A1* | 8/2018 | Rosa | ................... | H04W 48/18 |

FOREIGN PATENT DOCUMENTS

| | | |
|---|---|---|
| KR | 10-2010-0093260 A | 8/2010 |
| KR | 1020140031242 A | 3/2014 |
| WO | 2011/055999 A2 | 5/2011 |
| WO | 2012/081849 A2 | 6/2012 |
| WO | 2014115711 A1 | 7/2014 |

OTHER PUBLICATIONS

"3rd Generation Partnership Project; Technical Specification Group Services and System Aspects; Machine-Type and other Mobile Data Applications Communications Enhancements (Release 12)", 3rd Generation Partnership Project (3GPP), Mobile Competence Centre, 3GPP TR 23.887 V0.6.0 (Dec. 18, 2012), XP050682724.

* cited by examiner

Fig.14
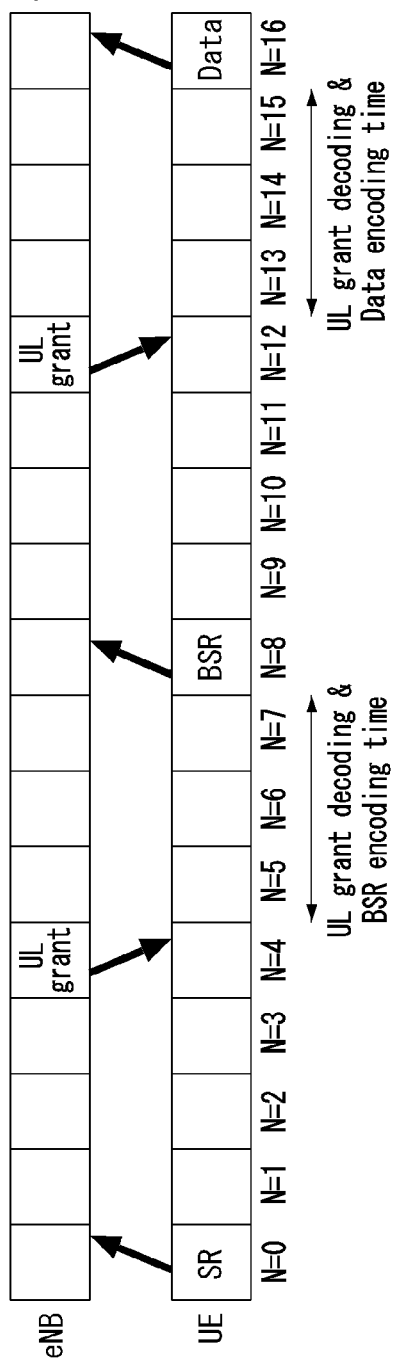
(a) Time taken for UL resource allocation method
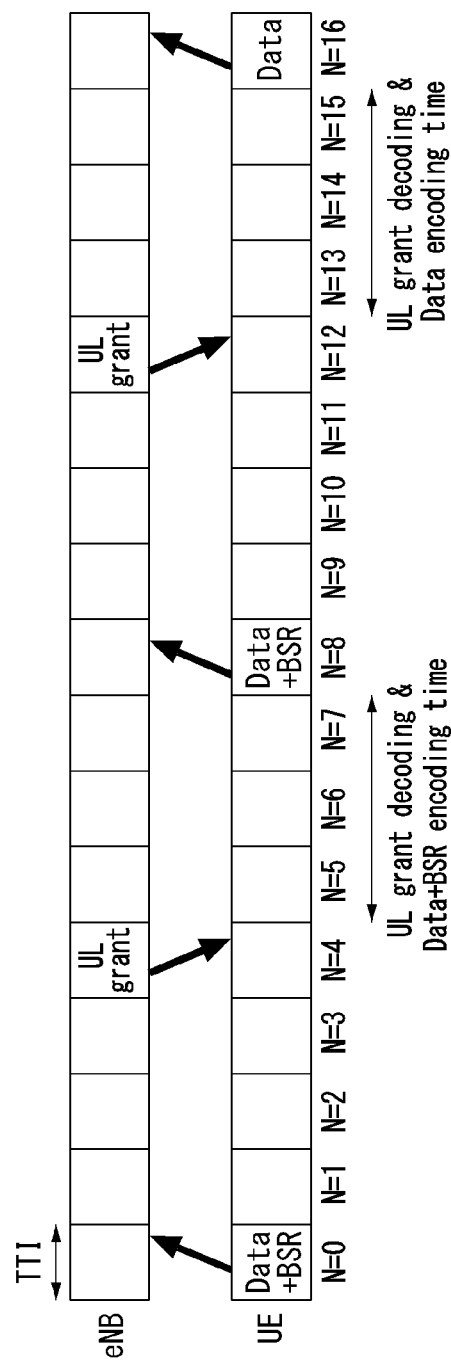
(b) Time taken for UL resource allocation method Fig.15
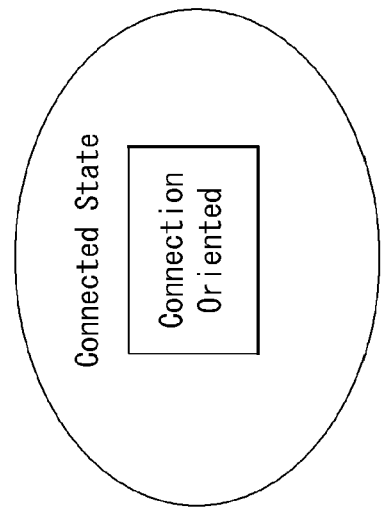
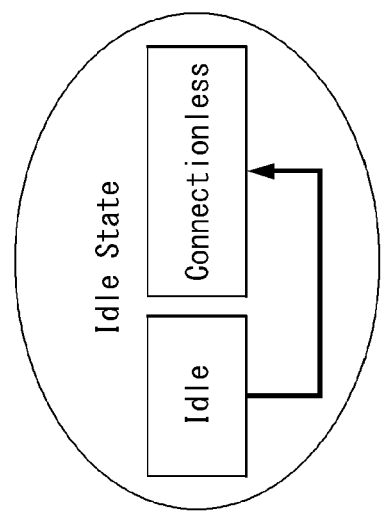

Fig.17
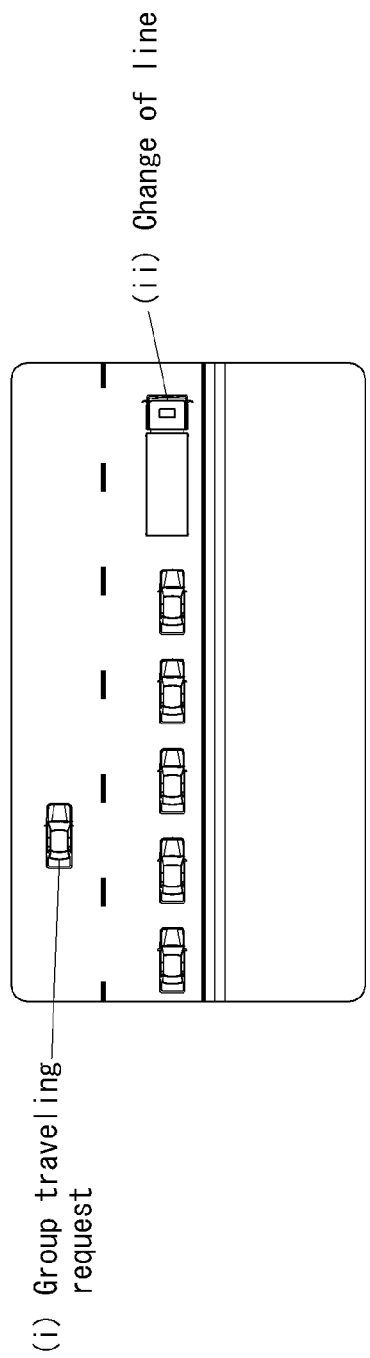
(a) Scenario in which subsequent data is generated in connectionless mode
(i) Group traveling request
(ii) Change of line
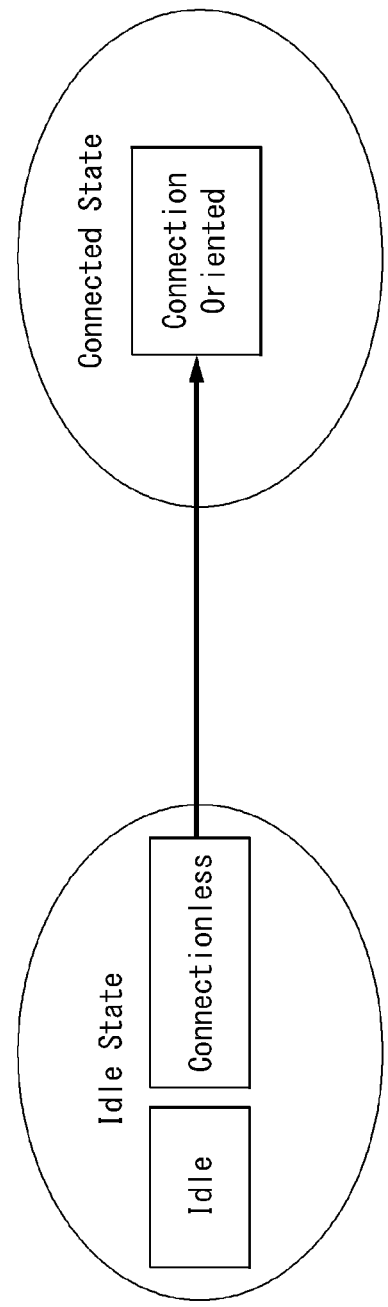
(b) Mode transition when subsequent data is generated in connectionless mode

METHOD AND APPARATUS FOR TRANSMITTING AND RECEIVING DATA, BY TERMINAL, IN WIRELESS COMMUNICATION SYSTEM

CROSS-REFERENCE TO RELATED APPLICATIONS

This application is the National Stage filing under 35 U.S.C. 371 of International Application No. PCT/KR2015/007365, filed on Jul. 15, 2015, the contents of which are all hereby incorporated by reference herein in their entirety.

TECHNICAL FIELD

The present invention relates to a method of transmitting and receiving, by a user equipment, data in a wireless communication system and, more particularly, to a method of switching, by a user equipment in an idle state, from a connectionless mode to the connection-oriented mode of a connected state during data transmission and reception and transmitting and receiving data and an apparatus supporting the same.

BACKGROUND ART

Mobile communication systems have emerged to provide a voice service while guaranteeing mobility of a user. The mobile communication system of today has been expanded to support data services in addition to the voice service. Due to the explosive increase of today's traffic, resources are running short; more and more users are demanding higher speed services; and a more advanced mobile communication system is required accordingly.

Key requirements for a next-generation mobile communication system include accommodation of explosive data traffic, significant increase of transmission rate per user, accommodation of a significantly increased number of connected devices, very low end-to-end latency, and high energy efficiency. In order to meet the requirements, various technologies such as dual connectivity, massive Multiple Input Multiple Output (MIMO), in-band full duplex, Non-Orthogonal Multiple Access (NOMA), super wideband, and device networking are being studied.

DISCLOSURE

Technical Problem

An object of the present invention is to provide a method for a UE in the idle state to switch to the connected state in a wireless communication system.

Furthermore, an object of the present invention is to provide a method for a UE to switch to the connection-oriented mode if the transmission and reception of additional data are required after the transmission and reception of data for low latency service in the connectionless mode in a wireless communication system.

Furthermore, an object of the present invention is to provide a method for a UE to rapidly switch from the connectionless mode to the connection-oriented mode in a wireless communication system.

Furthermore, an object of the present invention is to provide a method of switching from the connectionless mode to the connection-oriented mode based on a point of time at which additional data is generated in a wireless communication system.

Technical objects to be achieved by this specification are not limited to the aforementioned technical objects, and other technical objects not described above may be evidently understood by a person having ordinary skill in the art to which the present invention pertains from the following description.

Technical Solution

In order to solve the aforementioned problems, the present invention provides a method and apparatus for forming a connection in a wireless communication system.

Specifically, a method for forming a connection according to an embodiment of the present invention transmitting a request message for switching from an idle state to a connected state to an base station, wherein the idle state is divided into a first mode incapable of data transmission and reception and a second mode capable of data transmission and reception, and the request message includes a mode transition information element (IE) field requesting transition to the connected state; receiving a response message including resource information related to the transmission and reception of low latency service data as a response to the request message from the base station; transmitting or receiving a transfer message including the low latency service data to or from the base station based on the response message; switching from the idle state to the connected state; and transmitting or receiving additional data related to the low latency service data to or from the base station in the connected state, wherein the low latency service data is transmitted or received in the second mode.

Furthermore, in the present invention, the request message further includes at least one of a UE ID IE field indicative of the UE and a Tx indicator field indicative of the transmission or reception of the low latency service data.

Furthermore, in the present invention, the mode transition information element (IE) field includes at least one of a mode transition indicator indicating whether the request message is a message requesting transition to the connected state or a mode transition cause field indicative of a transition request cause to the connected state.

Furthermore, in the present invention, if the Tx indicator indicates the transmission of the low latency service data, the request message further includes a quality of service information element (QoS IE) field indicating characteristics of the low latency service data.

Furthermore, in the present invention, the resource information includes at least one of an uplink (UL) resource IE field indicative of UL resources for the transmission of the low latency service data or a target ID IE field indicating that the UL resources have been allocated to the terminal.

Furthermore, in the present invention, the request message or the transfer message further includes a security information element (IE) field indicative of information related to security.

Furthermore, in the present invention, the request message and the transfer message are together transmitted.

Furthermore, in the present invention, the step of switching includes the steps of receiving an RRC connection setup message for transition to the connected state from the base station; transmitting an RRC connection setup complete message to the base station after switching to an RRC connected state based on the RRC connection setup message; and performing security and data connection setup with the base station.

Furthermore, the present invention provides a method including the steps of receiving a request message for switching from an idle state to a connected state from a terminal, wherein the request message includes a mode transition information element (IE) field requesting transition to the connected state; transmitting a response message including resource information related to the transmission and reception of low latency service data to the terminal in response to the request message; and determining whether or not to transmit or receive the low latency service data.

Furthermore, in the present invention, the request message further includes at least one of a UE ID IE field indicative of the UE and a Tx indicator field indicative of the transmission or reception of the low latency service data.

Furthermore, in the present invention, the UE ID IE field includes at least one of an MME temporary mobile subscriber identity (T-TMSI) indicative of a UE ID, a public land mobile network identifier (PLMN ID) indicative of an operator network ID number, an MME group identifier (MMEGI) indicative of an MME group identifier or MME code (MMEC) indicative of an MME code ID.

Furthermore, in the present invention, the mode transition information element (IE) field includes at least one of a mode transition indicator indicating whether the request message is a message requesting transition to the connected state or a mode transition cause field indicative of a transition request cause to the connected state.

Furthermore, in the present invention, if the Tx indicator indicates the transmission of the low latency service data, the request message further includes a quality of service information element (QoS IE) field indicating characteristics of the low latency service data.

Furthermore, in the present invention, the resource information includes at least one of an uplink (UL) resource IE field indicative of UL resources for the transmission of the low latency service data or a target ID IE field indicating that the UL resources have been allocated to the terminal.

Furthermore, in the present invention, the request message or the transfer message further includes a security information element (IE) field indicative of information related to security.

Furthermore, in the present invention, the step of determining includes the steps of determining integrity of the terminal; transmitting or receiving a transfer message including the mode transition information element (IE) field and the low latency service data to or from a mobility management entity (MME); receiving a result message including transmission information indicating whether the low latency data has been transmitted and transition information related to the mode transition of the terminal from the mobility management entity (MME); performing security and data connection setup with the terminal; and transmitting or receiving additional data related to the low latency service data.

Furthermore, in the present invention, if the terminal is valid, the transmission information indicates that the low latency service data has been transmitted or received, the transition information includes at least one of a context setup request indicator indicating whether the data connection setup has been permitted, connection setup information related to the data connection setup of the terminal, or security configuration information related to the security configuration of the terminal, and the integrity of the terminal is determined by the base station or the MME.

Furthermore, the present invention provides a terminal including a communication unit transmitting or receiving a radio signal to or from an outside; and a processor functionally coupled to the communication unit, wherein the processor is configured to transmit a a request message for switching from an idle state to a connected state to a base station, wherein the idle state is divided into a first mode incapable of data transmission and reception and a second mode capable of data transmission and reception, and wherein the request message includes a mode transition information element (IE) field requesting transition to the connected state, receive a response message including resource information related to a transmission and reception of low latency service data in response to the request message from the base station, transmit or receiving a transfer message including the low latency service data to or from the base station based on the response message, switch from the idle state to the connected state, and transmit or receiving additional data related to the low latency service data to or from the base station in the connected state, wherein the low latency service data is transmitted or received in the second mode.

Furthermore, the present invention provides an base station including a communication unit transmitting and receiving a radio signal with an outside; and a processor functionally coupled to the communication unit, wherein the processor is configured to receive a request message for switching from an idle state to a connected state from a terminal, wherein the request message includes a mode transition information element (IE) field requesting transition to the connected state, transmit a response message including resource information related to a transmission and reception of low latency service data to the terminal in response to the request message, and determine whether or not to transmit or receive the low latency service data.

Advantageous Effects

The present invention has an effect in that it can reduce the transition time taken for a UE supporting low latency service to switch from the idle state to the connected state.

Furthermore, in the present invention, a UE supporting low latency service can switch from the connectionless mode for transmitting/receiving low latency data to the connection-oriented mode.

Furthermore, in the present invention, a UE supporting low latency service can switch to the connection-oriented mode when additional data is generated after the transmission and reception of data for low latency service in the connectionless mode.

Furthermore, the present invention can reduce the time taken for a UE supporting low latency service to switch to the connection-oriented mode when additional data is generated after the transmission and reception of data for low latency service in the connectionless mode.

Furthermore, in the present invention, a UE supporting low latency service can switch to the connection-oriented mode based on a point of time at which additional data is generated when the additional data is generated after the transmission and reception of data for low latency service in the connectionless mode.

Effects which may be obtained by this specification are not limited to the aforementioned effects, and other technical effects not described above may be evidently understood by a person having ordinary skill in the art to which the present invention pertains from the following description.

DESCRIPTION OF DRAWINGS

FIGS. 13 and 14 are a flowchart and a diagram, respectively, illustrating a method of converting from an idle state to a connected state and an example of a consumption time of an uplink resource allocation method.

FIG. 15 is a diagram showing a connectionless mode capable of data transmission and reception in the idle state to which the present invention may be applied.

FIG. 17 is a diagram showing an example in which the connectionless mode switches to the connection-oriented mode to which the present invention may be applied.

FIG. 31 is a diagram showing the time taken to switch to the connection-oriented mode if data is transmitted after the integrity verification of a UE, and FIG. 32 is a diagram showing the time taken to switch to the connection-oriented mode if data is transmitted prior to the integrity verification of a UE.

MODE FOR INVENTION

Figure 1:
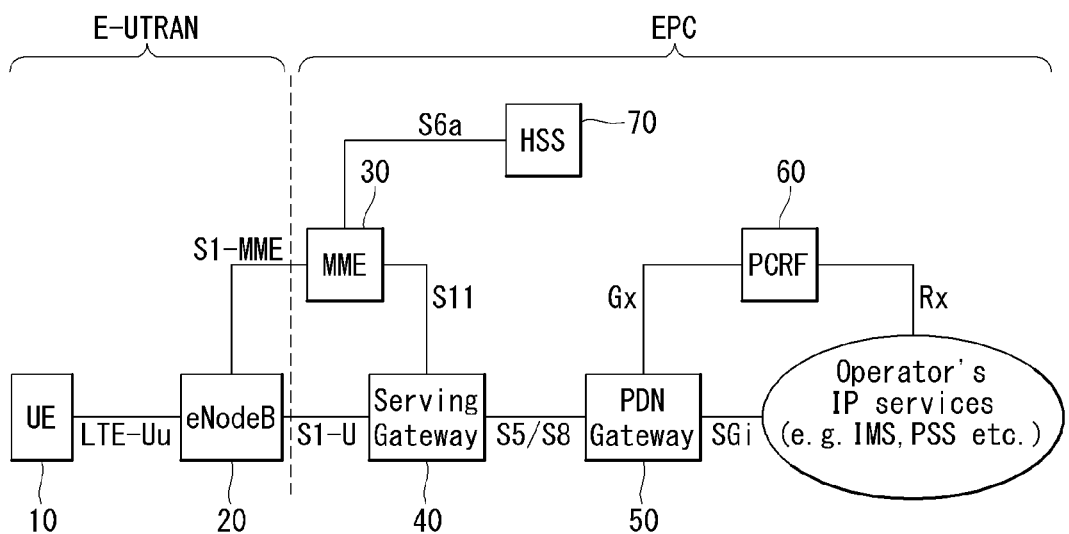
FIG. 1 illustrates an Evolved Packet System which is associated with the Long Term Evolution (LTE) system to which the present invention can be applied.

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, a message, frame, a signal, field and an apparatus are not limited to each of the names as for the purpose of explaining the invention, and may be replaced with a other message, other frame, a other signal, other field and a other apparatus that performs the same function.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', 'MeNB(Macro eNB)', 'SeNB(Secondary eNB)' etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device(D2D) device', wireless device, etc.

Further, a 'terminal' may be fixed or may have mobility and may be replaced with a term such as a User Equipment (UE), Mobile Station (MS), user terminal (UT), Mobile Subscriber Station (MSS), Subscriber Station (SS), Advanced Mobile Station (AMS), Wireless terminal (WT), Machine-Type Communication (MTC) device, Machine-to-Machine (M2M) device, and Device-to-Device (D2D) device.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

FIG. 1 illustrates an Evolved Packet System which is associated with the Long Term Evolution (LTE) system to which the present invention can be applied.

The LTE system aims to provide seamless Internet Protocol (IP) connectivity between a user equipment (UE) 10 and a pack data network (PDN), without any disruption to the end user's application during mobility. While the LTE system encompasses the evolution of the radio access through an E-UTRAN (Evolved Universal Terrestrial Radio Access Network) which defines radio protocol architecture between a user equipment and a base station 20, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 40, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

In the present invention, the MME 30 corresponds to an entity in which a function necessary to process authentication of the UE and context information is implemented, where the MME 30 is described as one embodiment of the entity. Therefore, other devices in addition to the MME 30 can also carry out the corresponding function.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

In the present invention, the S-GW 40 corresponds to an entity in which a function necessary for processing authentication of the UE and context information is implemented, where the S-GW 40 is described as one embodiment of the entity. Therefore, other devices in addition to the S-GW 40 can also carry out the corresponding function.

The P-GW 50 serves to perform IP address allocation for the UE, as well as QoS enforcement and flow-based charging according to rules from the PCRF 60. The P-GW 50 performs QoS enforcement for Guaranteed Bit Rate (GBR)

bearers. It also serves as the mobility anchor for interworking with non-3GPP technologies such as CDMA2000 and WiMAX networks.

In the present invention, the P-GW 50 corresponds to an entity in which a function necessary for processing routing/forwarding of user data is implemented, where the P-GW 50 is described as one embodiment of the entity. Therefore, other devices in addition to the P-GW 50 can also carry out the corresponding function.

The PCRF 60 performs policy control decision-making and performs flow-based charging.

The HSS 70 is also referred to as a Home Location Register (HLR) and includes SAE subscription data including information about access control for roaming and an EPS-subscribed QoS profile. Further, the HSS 70 also includes information about a PDN to which the user accesses. Such information may be maintained in an Access Point Name (APN) form, and the APN is an identification technique that describes a PDN address representing an access point of the PDN or a subscribed IP address with a Domain Name system (DNS)-based label.

Between the EPS network elements shown in FIG. 1, various interfaces such as an S1-U, S1-MME, S5/S8, S11, S6a, Gx, Rx and SGi are defined.

Hereinafter, the concept of mobility management (MM) and a mobility management (MM) back-off timer is explained in detail. The mobility management is a procedure to reduce the overhead in the E-UTRAN and processing in the UE. When the mobility management is performed, all UE-related information in the access network can be released during periods of data inactivity. This state can be referred to as EPS Connection Management IDLE (ECM-IDLE). The MME retains the UE context and the information about the established bearers during the idle periods.

To allow the network to contact a UE in the ECM-IDLE, the UE updates the network as to its new location whenever it moves out of its current Tracking Area (TA). This procedure is called a 'Tracking Area Update', and a similar procedure is also defined in a universal terrestrial radio access network (UTRAN) or GSM EDGE Radio Access Network (GERAN) system and is called a 'Routing Area Update'. The MME serves to keep track of the user location while the UE is in the ECM-IDLE state.

When there is a need to deliver downlink data to the UE in the ECM-IDLE state, the MME transmits the paging message to all base stations (i.e., eNodeBs) in its current tracking area (TA). Thereafter, eNBs start to page the UE over the radio interface. On receipt of a paging message, the UE performs a certain procedure which results in changing the UE to ECM-CONNECTED state. This procedure is called a 'Service Request Procedure'. UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer can be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

Figure 2:
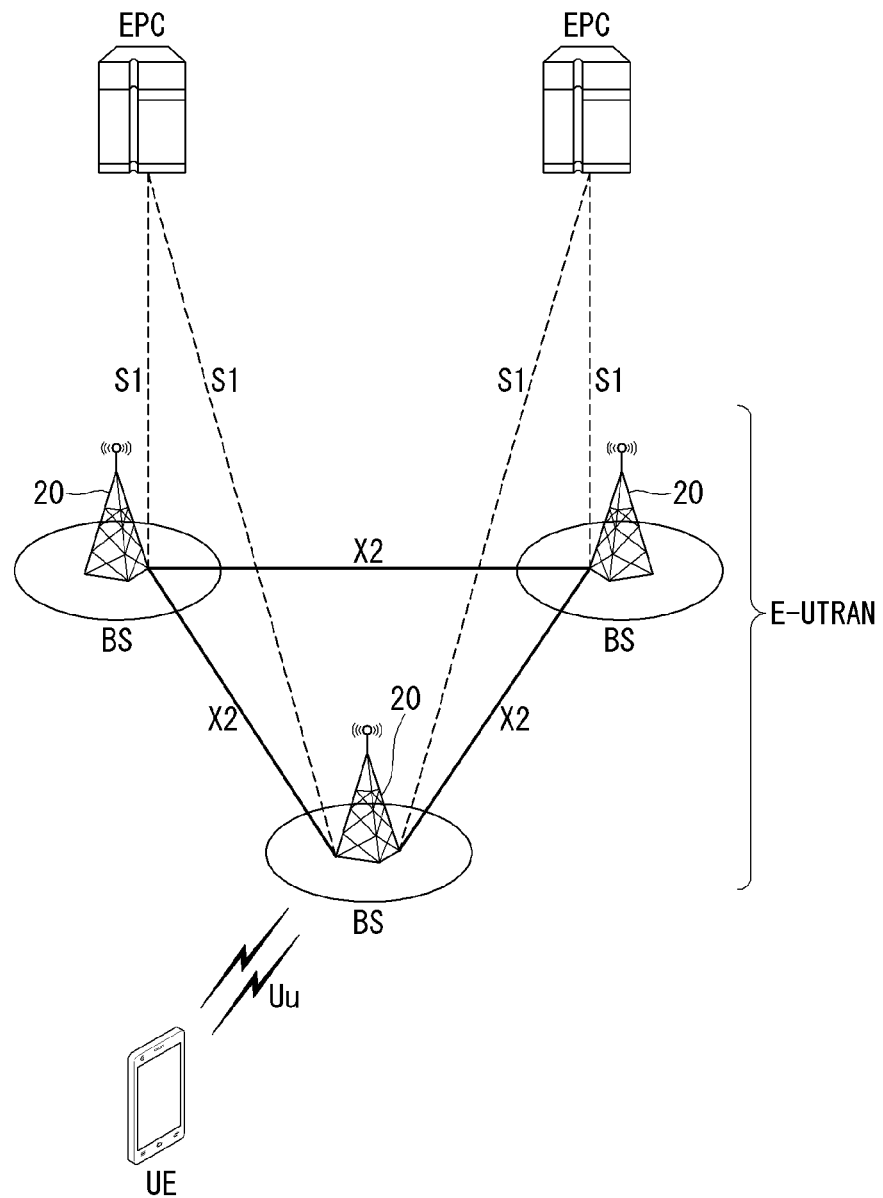
FIG. 2 illustrates a wireless communication system to which the present invention is applied.

FIG. 2 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10.

The BSs 20 are interconnected by means of an X2 interface. The BSs 20 are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
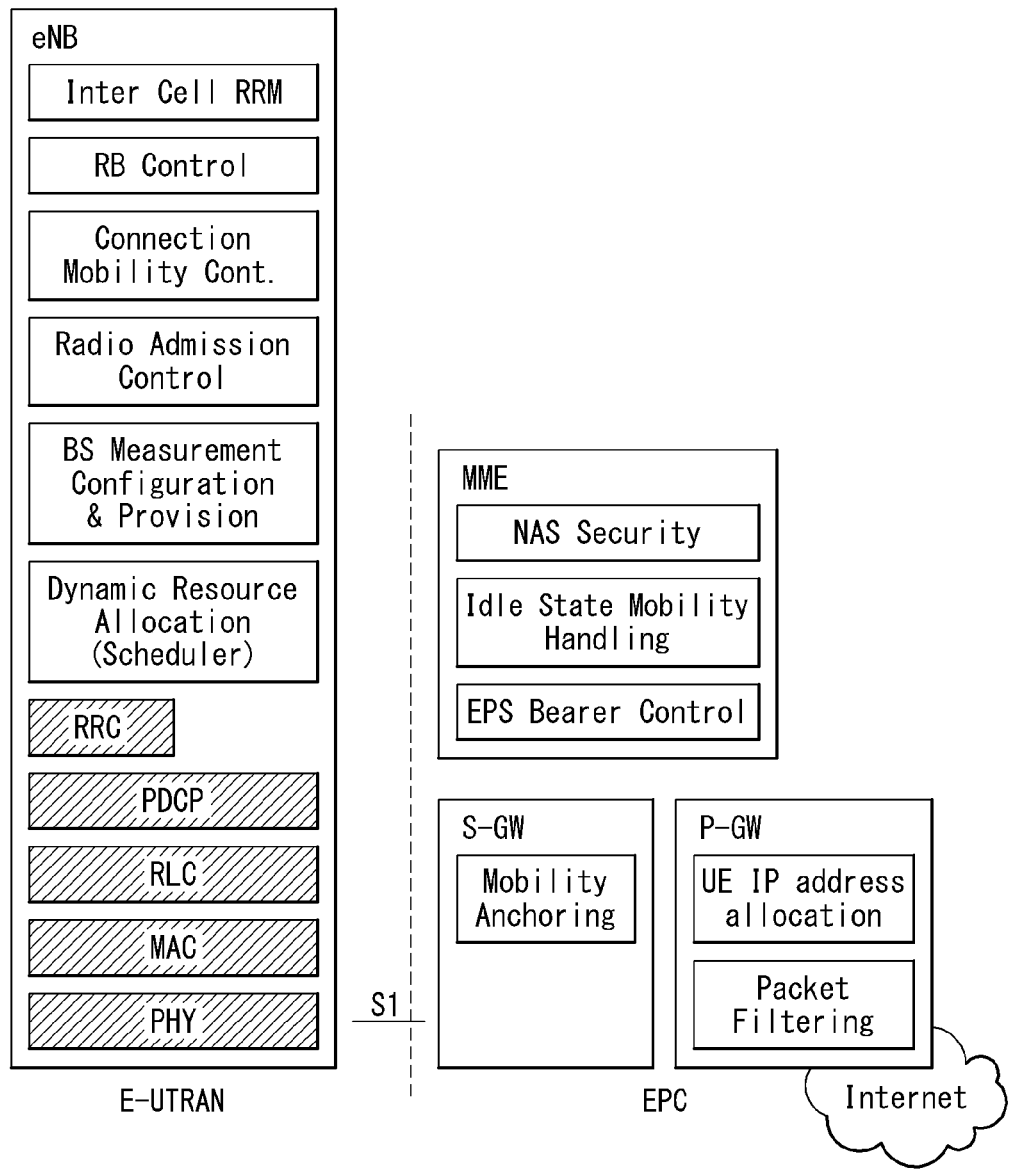
FIG. 3 illustrates a functional split of an E-UTRAN and an EPC to which the present invention can be applied.

FIG. 3 illustrates a functional split of an E-UTRAN and an EPC to which the present invention can be applied.

Referring to FIG. 3, a slashed block represents a radio protocol layer, and an empty block represents a functional entity of a control plane.

The base station performs the following functions. (1) a Radio Resource Management (RRM) function such as Radio Bearer Control, Radio Admission Control, Connection Mobility Control, and dynamic resource allocation to the terminal, (2) Internet Protocol (IP) header compression and encryption of user data stream, (3) routing of user plane data to S-GW, (4) scheduling and transmission of a paging message, (5) scheduling and transmission of broadcast information, and (6) measurement and measurement report setup for mobility and scheduling.

The MME performs the following functions. (1) Distribution of a paging message to base stations, (2) Security Control, (3) Idle State Mobility Control, (4) SAE bearer control, and (5) Integrity Protection and Ciphering of Non-Access Stratum (NAS) signaling.

The S-GW performs the following functions. (1) Termination of a user plane packet of paging, and (2) user plane switching for supporting terminal mobility.

Figure 4:
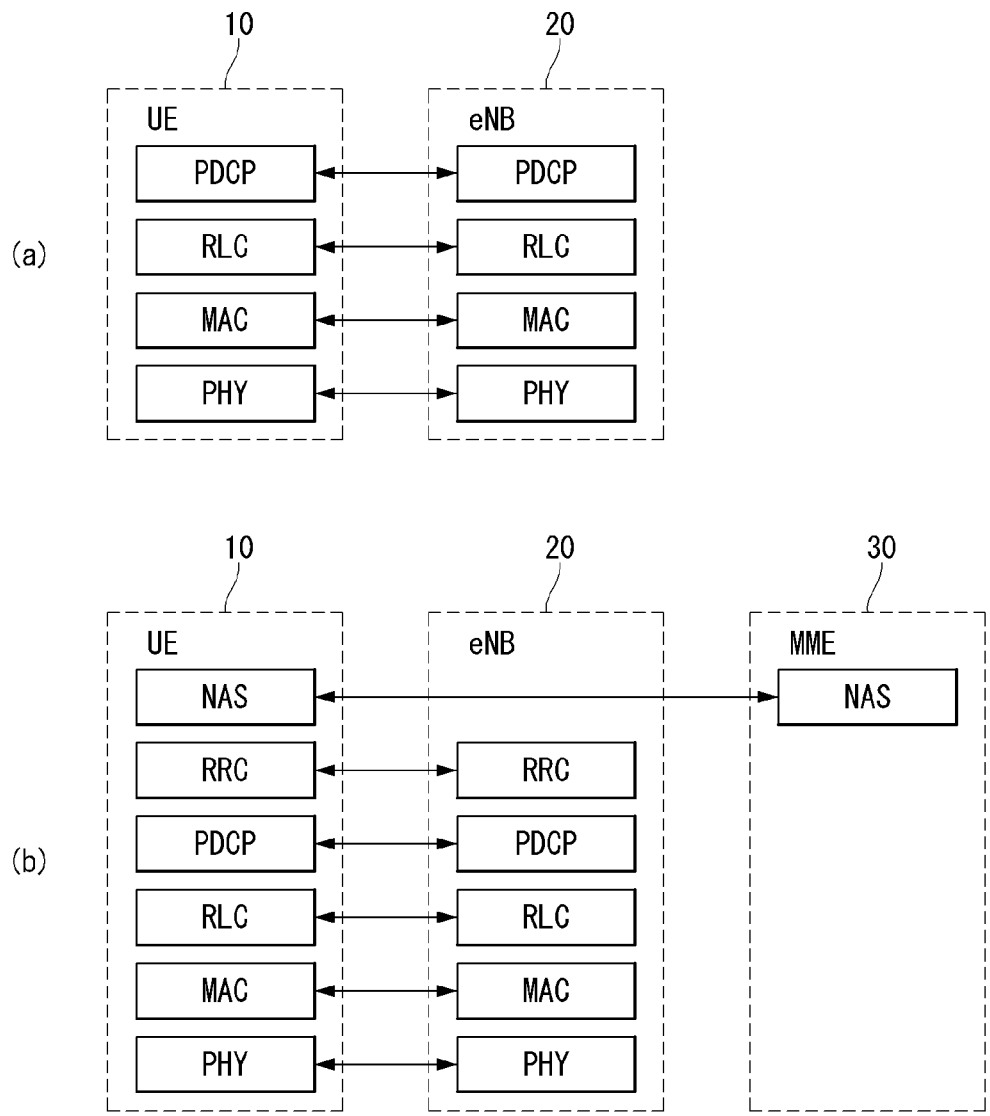
FIG. 4 is a block diagram illustrating an example of a radio protocol architecture to which a technical characteristic of the present invention may be applied.

FIG. 4 is a block diagram illustrating an example of a radio protocol architecture to which a technical characteristic of the present invention may be applied.

FIG. 4(*a*) is a block diagram illustrating an example of a radio protocol architecture of a user plane, and FIG. 4(*b*) is a block diagram illustrating an example of a radio protocol architecture of a control plane.

The user plane is a protocol stack for transmitting user data, and the control plane is a protocol stack for transmitting a control signal.

Referring to FIGS. 4(*a*) and 4(*b*), a PHY layer provides an upper layer with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

Figure 5:
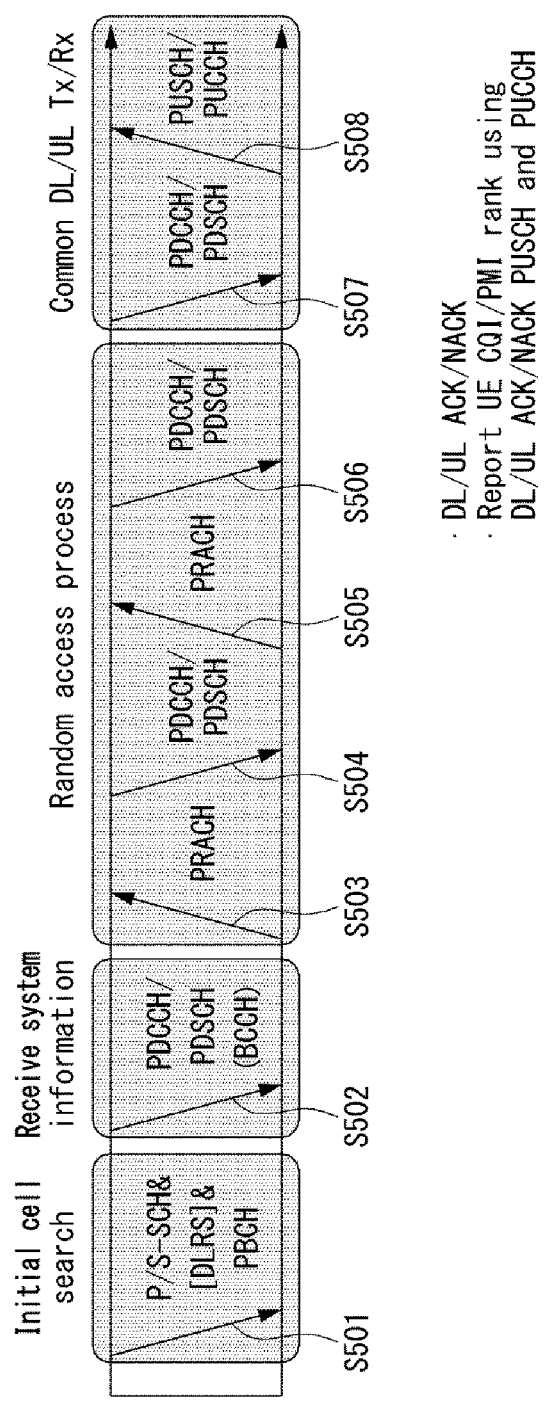
FIG. 5 illustrates physical channels used for the 3GPP LTE/LTE-A system to which the present invention can be applied and a general signal transmission method using the physical channels.

FIG. 5 illustrates physical channels used for the 3GPP LTE/LTE-A system to which the present invention can be applied and a general signal transmission method using the physical channels.

A UE, which may have been powered on again from the power-off state or may have newly entered a cell, carries out the initial cell search task such as synchronizing itself with an eNB in the S501 step. To this purpose, the UE synchronizes with the eNB by receiving a primary synchronization channel (P-SCH) and a secondary synchronization channel (S-SCH) from the eNB and obtains information such as a cell ID (identifier).

Afterwards, the UE receives a physical broadcast channel (PBCH) signal from the eNB and obtains broadcast signal within the eNB. Meanwhile, the UE receives a downlink reference signal (DL RS) in the initial cell search step to check the downlink channel status.

The UE which has finished the initial cell search receives a PDSCH according to the PDCCH and PDCCH information in the S502 step to obtain more specific system information.

Next, the UE may carry out a random access procedure such as the steps of S503 to S506 to complete a connection process to the eNB. To this purpose, the UE transmits a preamble S503 through a physical random access channel (PRACH) and receives a response message in response to the preamble through a PDSCH corresponding to the PRACH S304. In the case of contention-based random access, the UE may carry out a contention resolution procedure including transmission of an additional PRACH signal S305 and reception of a PDCCH signal and the PDSCH signal corresponding to the PDCCH signal S506.

Afterwards, the UE which has carried out the procedure above may carry out reception S507 of the PDCCH signal and/or PDSCH signal and transmission S508 of a PUSCH signal and/or a PUCCH signal as a conventional uplink/downlink signal transmission procedure.

The control information that the UE transmits to the eNB is called collectively uplink control information (UCI). The UCI includes HARQ-ACK/NACK, a scheduling request (SR), a channel quality indicator (CQI), a precoding matrix indicator (PMI), and rank indication (RI) information.

In the LTE/LTE-A system, the UCI is transmitted periodically through the PUCCH; the UCI can be transmitted through the PUSCH if control information and traffic data have to be transmitted at the same time. Also, the UCI can be transmitted non-periodically through the PUSCH according to a request or a command from the network.

Figure 6:
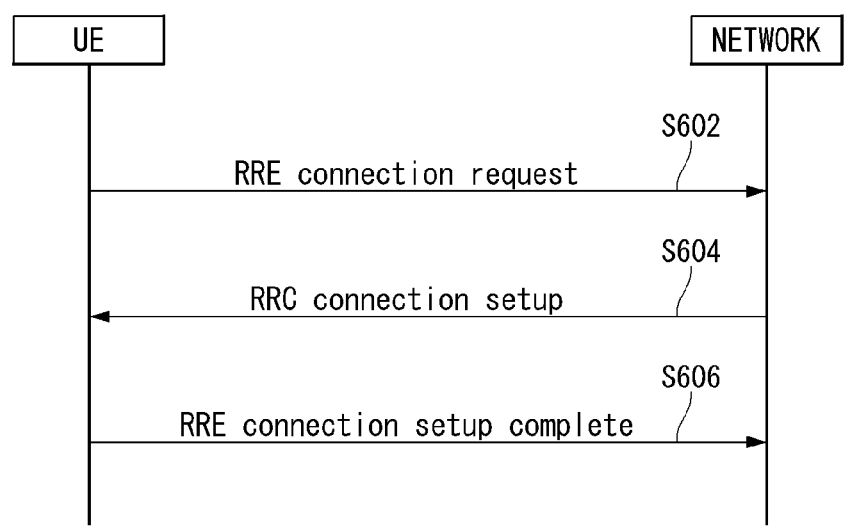
FIG. 6 is a flowchart illustrating a process of establishing an RRC connection to which the present invention may be applied.

FIG. 6 is a flowchart illustrating a process of establishing an RRC connection to which the present invention may be applied.

An RRC state represents whether an RRC layer of the UE is logically connected to an RRC layer of the E-UTRAN, and a state in which an RRC layer of the UE is logically connected to an RRC layer of the E-UTRAN is referred to as an RRC connected state, and a state in which an RRC layer of the UE is not logically connected to an RRC layer of the E-UTRAN is referred to as an RRC idle state. In the UE of an RRC connected state, because an RRC connection exists, the E-UTRAN may determine in a cell unit whether a corresponding UE exists, thereby effectively controlling the UE.

However, the E-UTRAN may not determine the UE in an RRC idle state, but a core network (CN) manages the UE in an RRC idle state in a tracking area unit, which is an area unit larger than a cell. That is, it is determined only whether the UE in an RRC idle state exists in a large area unit, and in order to receive a common mobile communication service such as voice or data, the UE should be changed to an RRC connected state.

When a user turns on power of the UE, the UE first searches for an appropriate cell and stays an RRC idle state in the corresponding cell. When it is necessary that the UE in an RRC idle state performs an RRC connection, the UE establishes an RRC connection with the E-UTRAN through an RRC connection procedure and is changed to an RRC connected state. Several cases in which the UE in an RRC idle state should perform an RRC connection may include, for example, a case in which uplink data transmission is required with the reason such as a user's call attempt or a case of transmission of a response message when the UE receives a paging message from the E-UTRAN.

A non-access stratum (NAS) layer located at a superordinate layer of an RRC layer performs a function of session management and mobility management.

In the NAS layer, in order to manage mobility of the UE, two states of EPS Mobility Management-REGISTERED (EMM-REGISTERED) and EMM-DEREGISTERED are defined and are applied to the UE and the MME. An initial UE is in an EMM-DEREGISTERED state, and in order to access to the network, the UE performs a process of registering at the corresponding network through an initial attach procedure. When the attach procedure is successfully performed, the UE and the MME become an EMM-REGISTERED state.

In order to manage signaling connection between the UE and an EPC, two states of an EPS Connection Management (ECM)-IDLE state and an ECM-CONNECTED state are defined and are applied to the UE and the MME. When the UE of an ECM-IDLE state is RRC-connected with the E-UTRAN, the corresponding UE becomes an ECM-CONNECTED state.

When the MME in an ECM-IDLE state is S1-connected with E-UTRAN, the MME becomes an ECM-CONNECTED state. When the UE is in an ECM-IDLE state, the E-UTRAN does not have context information of the UE. Therefore, the UE in an ECM-IDLE state performs a UE-based mobility related procedure such as cell selection or cell reselection without necessity to receive a command of the network. However, when the UE is in an ECM-CONNECTED state, mobility of the UE is managed by a command of the network. In an ECM-IDLE state, when a location of the UE is different from a location in which the network knows, the UE notifies the network of a corresponding location thereof through a tracking area update procedure.

Hereinafter, system information will be described.

The system information includes indispensable information in which the UE should know in order to access to the eNB. Therefore, before the UE accesses to the eNB, the UE should receive the entire system information and always have update system information. Because the system information is information in which all UEs within one cell should know, the eNB periodically transmits the system information.

According to a chapter 5.2.2 of 3GPP TS 36.331 V8.7.0 (2009-09) "Radio Resource Control (RRC); Protocol specification (Release 8)", the system information is divided into a Master Information Block (MIB), a Scheduling Block (SB), and a System Information Block (SIB). The MIB enables the UE to know a physical configuration, for example, a bandwidth of a corresponding cell. The SB notifies transmission information, for example, a transmission cycle of SIBs. The SIB is an assembly of related system information. For example, any SIB includes only information of a peripheral cell and includes only information of an uplink radio channel in which the UE uses.

In order to enter from an RRC idle state to an RRC connected state, the UE transmits an RRC connection request message that requests connection to the network (S602). The network transmits an RRC connection setup message to the UE in response to the RRC connection request (S604). The UE receives the RRC connection setup message and enters an RRC connected state.

The UE transmits an RRC connection setup complete message used for determining successful completion of RRC connection establishment to the network (S606).

However, when the network may not perform an RRC connection, the network transmits an RRC connection reject message to the UE in response to the RRC connection request.

Figure 7:
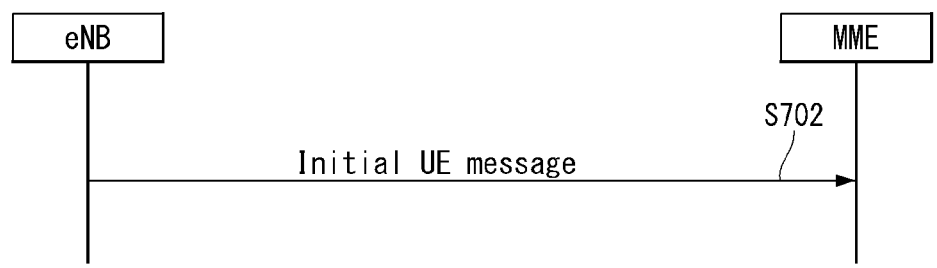
FIG. 7 is a flowchart illustrating a method of transmitting a Non Access Stratum (NAS) message to which the present invention may be applied.

FIG. 7 is a flowchart illustrating a method of transmitting a Non Access Stratum (NAS) message to which the present invention may be applied.

Referring to FIG. 7, the NAS message may be included in an Information Element (IE) of an initial UE message, a Downlink NAS Transport Message, or an Uplink NAS Transport Message to be transmitted to the MME (S702).

The NAS Transport is required for transmitting signaling between the UE and the MME through an S1 interface, and when the S1 interface is not connected, a procedure that sets the S1 interface may be first performed.

In this way, the UE may transmit Tracking Area Update (TAU) or a service request to the MME through the eNB and an initial UE message, which is the NAS message.

Figure 8:
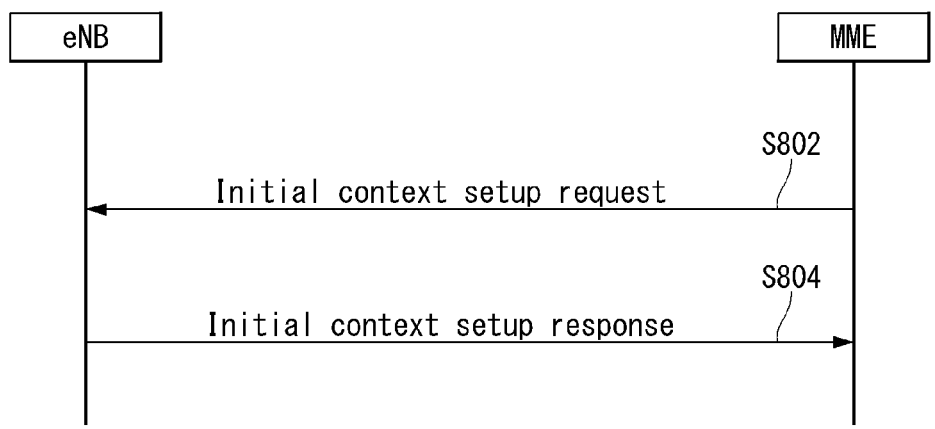
FIG. 8 is a flowchart illustrating an initial context setup method to which the present invention may be applied.

FIG. 8 is a flowchart illustrating an initial context setup method to which the present invention may be applied.

The initial context setup procedure is required for setting necessary entire UE context information, and the UE context information may include an E-RAB context, security key, Handover Restriction List, UE Radio Capability, and/or UE Security Capability. That is, the context information (or UE context information) may include overall information of the UE.

In this case, when the MME has such information, the UE Radio Capability information may be transmitted and thus when the MME does not initially know the UE, the UE Radio Capability information may not be transmitted.

For the initial context setup, the MME may transmit an initial context setup request message to the eNB (S802).

The eNB, having received the initial context setup request message transmits an initial context setup response in response to the initial context setup request message to the MME (S804) and performs an initial context setup procedure.

Figure 9:
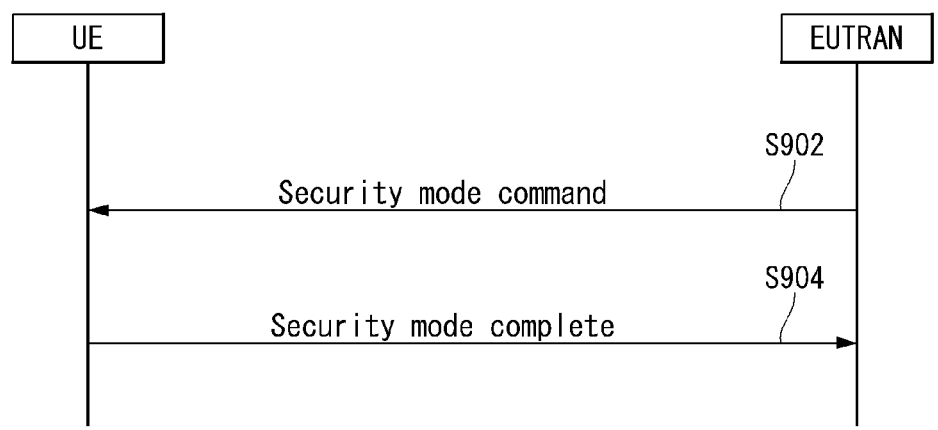
FIG. 9 is a flowchart showing an initial security activation method to which the present invention may be applied.

FIG. 9 is a flowchart showing an initial security activation method to which the present invention may be applied.

Referring to FIG. 9, the E-UTRAN initiates a security activation process by transmitting a security mode command message to a UE in the RRC connected state (S902). This process is a case where only the SRB1 has been established and is a process prior to SRB2 and DRB establishment.

When the UE receives the security mode command message, it generates a $K_{eNB}$ key. Furthermore, the UE generates a $K_{RRCint}$ key associated with an integrity check algorithm indicated by the security mode command message.

Thereafter, the UE instructs a lower layer to check the integrity of the security mode command message using an integrity check algorithm and the $K_{RRCint}$ key. If the integrity check of the security mode command message is successful, it generates a $K_{RRCenc}$ key and $K_{UPenc}$ key associated with an ciphering algorithm indicated by the security mode command message.

Thereafter, the UE instructs the lower layer to perform integrity check using the integrity check algorithm and the $K_{RRCint}$ key on subsequent RRC messages including a security mode complete message, and at the same time configures an ciphering process using the ciphering algorithm, the $K_{RRCenc}$ key and the $K_{UPenc}$ key so that ciphering process is applied.

After such a process is completed, the UE considers AS layer security to have been activated and transmits the security mode complete message to the E-UTRAN, thereby terminating the security activation process (S904).

In contrast, if the integrity check of the security mode command message has failed, the UE uses a configuration used before the security mode command message is received. Furthermore, the UE terminates the security activation process by transmitting a security mode failure message to the E-UTRAN.

Figure 10:
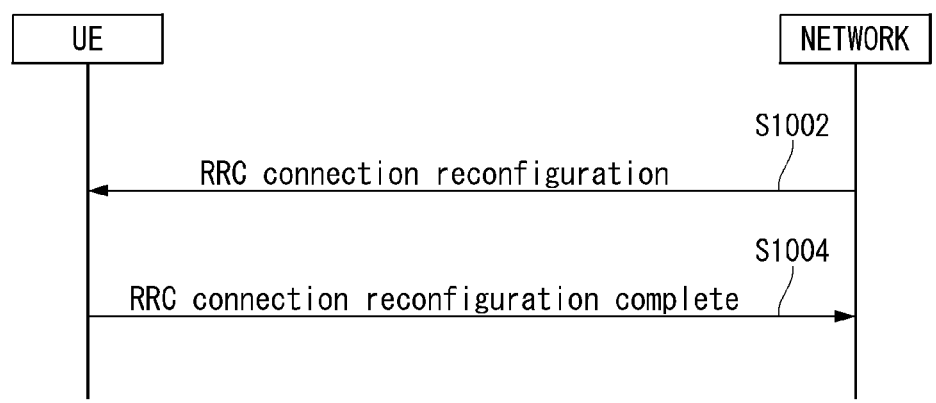
FIG. 10 is a flowchart illustrating an RRC connection reconfiguration process to which the present invention may be applied.

FIG. 10 is a flowchart showing an RRC connection reconfiguration process to which the present invention may be applied.

An RRC connection reconfiguration is used to modify an RRC connection. This is used to setup/modify/release an RB, perform handover, and setup/modify/release measurement.

A network transmits an RRC connection reconfiguration message for modifying an RRC connection to a UE (S1002). The UE transmits an RRC connection reconfiguration complete message used to check the successful completion of the RRC connection reconfiguration to the network as a response to the RRC connection reconfiguration (S1004).

The RRC connection reestablishment procedure is described below.

Figure 11:
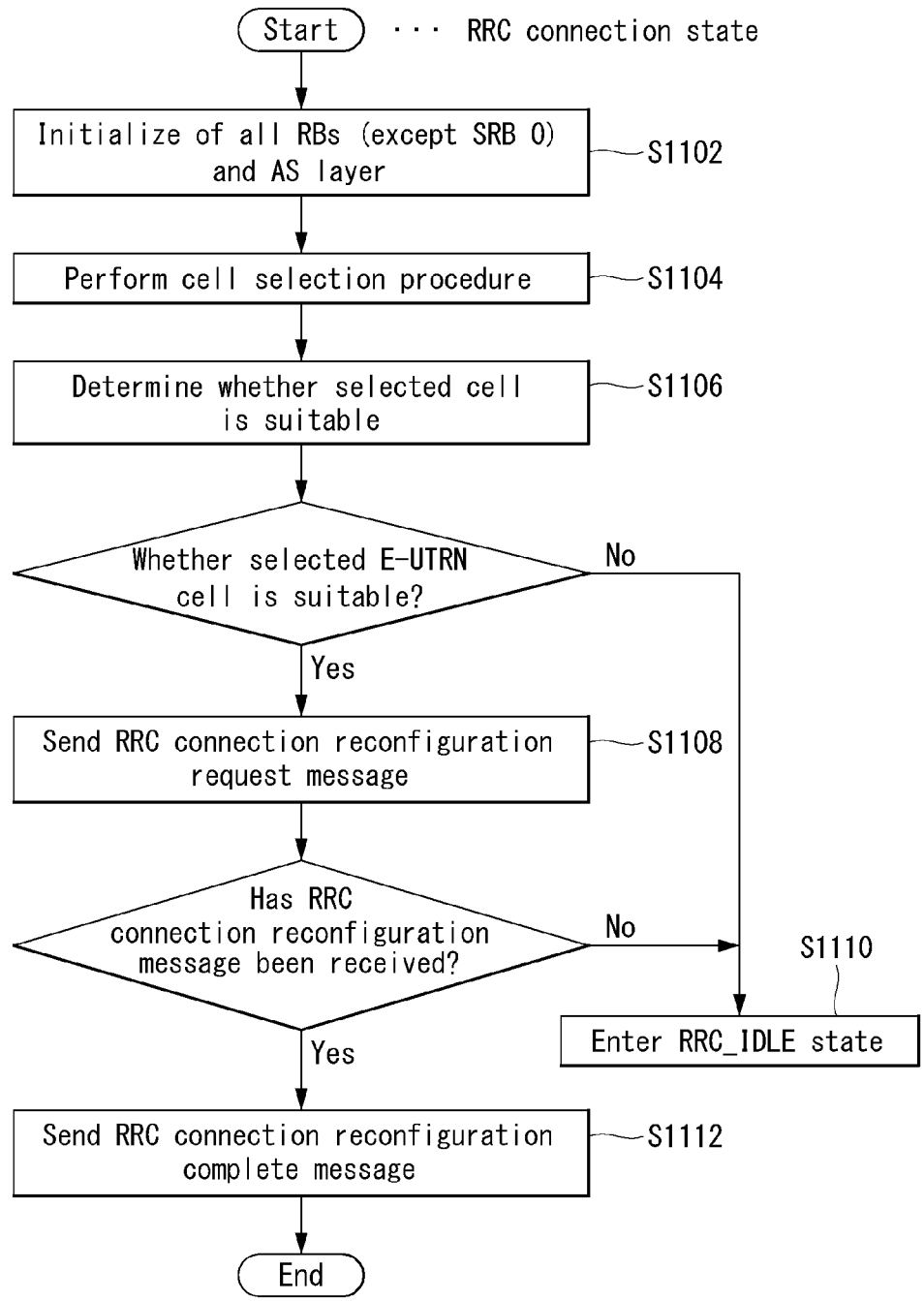
FIG. 11 is a flowchart illustrating an example of an RRC connection re-establishment procedure to which the present invention may be applied.

FIG. 11 is a flowchart illustrating an example of an RRC connection re-establishment procedure to which the present invention may be applied.

Referring to FIG. 11, the UE stops use of preset entire radio bearer, except for Signaling Radio Bearer (SRB 0) and initializes various sub-layers of Access Stratum (AS) (S1102).

Further, the UE sets each sub-layer and physical layer to a default configuration. In such a process, the UE maintains an RRC connected state.

The UE performs a cell selection procedure for performing an RRC connection re-establishment procedure (S1104). A cell selection procedure among an RRC connection re-establishment procedure may be performed to correspond with a cell selection procedure in which the UE performs in an RRC idle state, even if the UE maintains an RRC connected state.

The UE performs a cell selection procedure, determines system information of a corresponding cell, and determines whether the corresponding cell is an appropriate cell (S1106). If the selected cell is an appropriate E-UTRAN cell, the UE transmits an RRC connection re-establishment request message to the corresponding cell (S1108).

If a cell selected through a cell selection procedure for performing an RRC connection re-establishment procedure is a cell using another RAT other than an E-UTRAN, the UE stops an RRC connection re-establishment procedure and enters an RRC idle state (S1110).

The UE may be implemented to finish appropriateness determination of the cell within a limited time through a cell selection procedure and reception of system information of the selected cell. For this reason, the UE may start an RRC connection re-establishment procedure to run a timer. If the UE selects an appropriate cell, the timer may be stopped. When the timer is terminated, the UE may regard that an RRC connection re-establishment procedure was failed and enter an RRC idle state. Hereinafter, the timer is referred to as a radio link failure timer. In LTE spec TS 36.331, a timer named as T311 may be used as a radio link failure timer. The UE may acquire a setup value thereof from system information of a serving cell.

When the cell receives an RRC connection re-establishment request message from the UE and allows a request, the cell transmits an RRC connection re-establishment message to the UE.

The UE, having received the RRC connection re-establishment message from the cell reconfigures a PDCP sub-layer and an RLC sub-layer of SRB1. Further, the UE again calculates various key values related to security setup and reconfigures the PDCP sub-layer that performs security with newly calculated security key values.

Thereby, SRB 1 between the UE and the cell is opened and an RRC control message may be given and received. The UE completes restart of SRB1 and transmits an RRC connection re-establishment complete message in which an RRC connection re-establishment procedure has been complete to the cell (S1112).

However, when the UE receives an RRC connection re-establishment request message from the UE and does not allow the request, the cell transmits an RRC connection re-establishment reject message to the UE.

When an RRC connection re-establishment procedure is successfully performed, the cell and the UE perform an RRC connection re-establishment procedure. Thereby, the UE recovers a state before performing an RRC connection re-establishment procedure and guarantees continuity of the service to the maximum.

Figure 12:
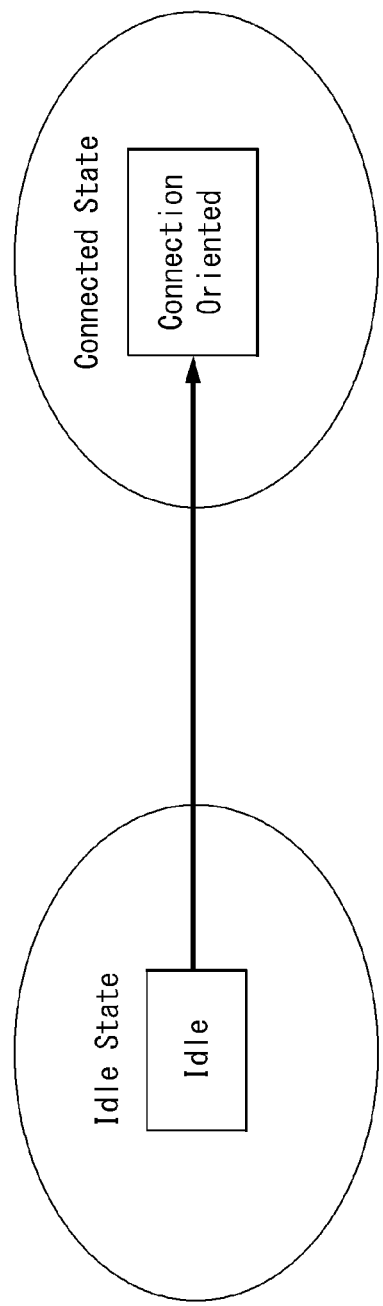
FIG. 12 is a diagram showing transition from the idle state to the connected state.

FIG. 12 is a diagram showing transition from the idle state to the connected state.

Referring to FIG. 12, in order to transmit and receive data, a UE in the idle state must perform an RRC connection configuration and a data connection setup in advance. This means that logical connection (S1 connection/interface, ECM connection, EPS bearer) establishment with a mobility management entity (MME) is completed in addition to logical connection (RRC connection) establishment with an eNB.

A method of switching from the idle state to the connected state is described below.

Figure 13:
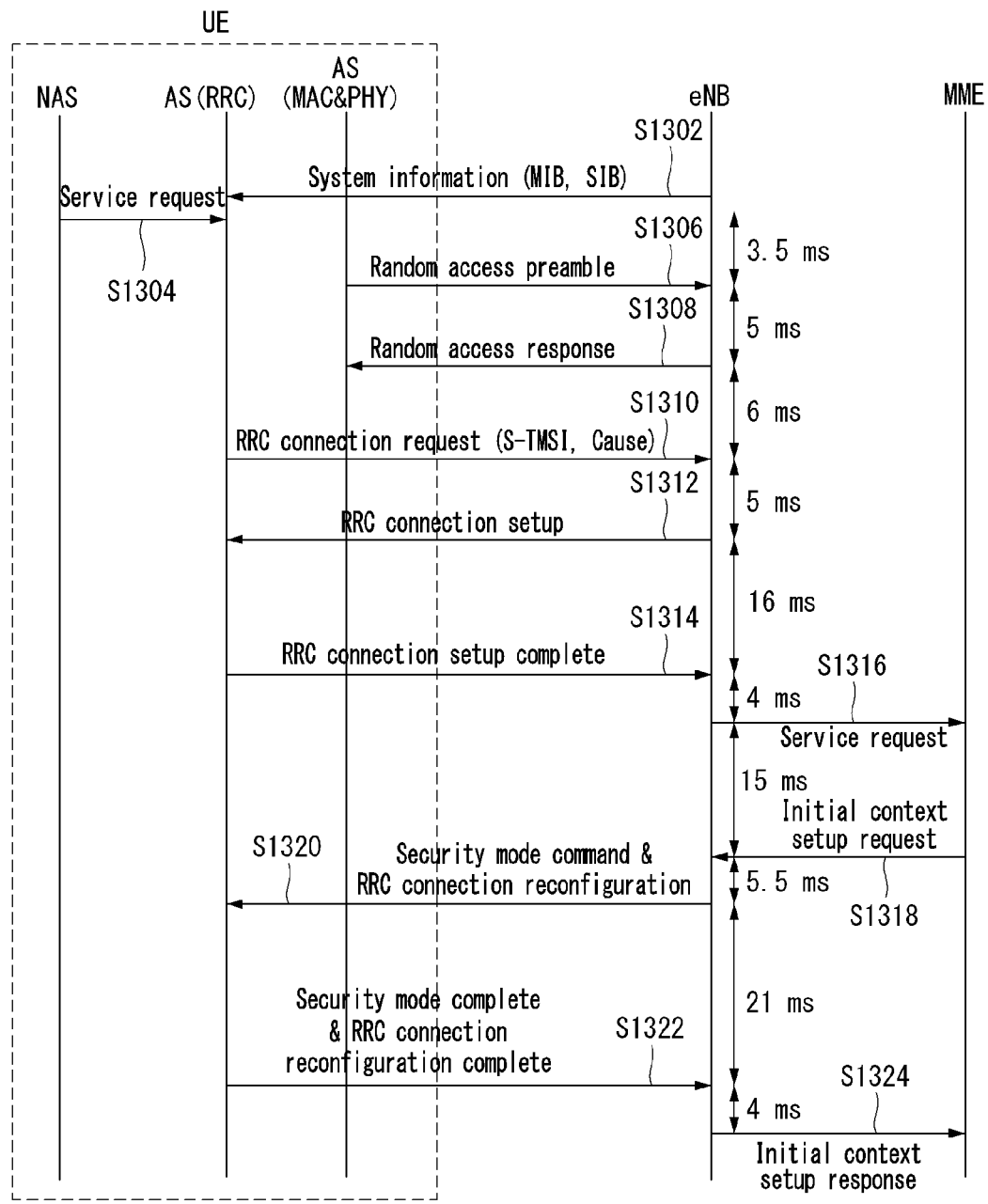

FIGS. 13 and 14 are a flowchart and a diagram, respectively, illustrating a method of converting from an idle state to a connected state and an example of a consumption time of an uplink resource allocation method.

Referring to FIGS. 13 and 14, in order to set a security session and a data session with the eNB, an UE of an idle state should perform an RRC connection procedure and for this, a predetermined time is consumed.

When describing in detail an RRC connection procedure, the UE receives system information from the eNB (S1302).

The system information may be classified into a Mater Information Block (MIB) or a System Information Block (SIB), and the MIB is transmitted through a PBCH, and the SIB is transmitted through a PDSCH.

A detailed description of the system information has been described in the foregoing description.

Thereafter, the UE transmits a service request to the RRC (or AS) layer in the NAS (within the UE) (S1304).

The UE receives and stores information about random access from the eNB through the system information, and when random access is required, the UE transmits a random access preamble to the eNB (S1306).

When the eNB receives the random access preamble from the UE, the eNB transmits a random access response message to the UE (S1308). Specifically, downward scheduling information about the random access response message may be CRC-masked with a Random Access-Radio Network Temporary Identifier (RA-RNTI) to be transmitted on an L1 or L2 control channel (PDCCH). The UE, having received downward scheduling signal masked with the RA-RNTI may receive and decode a random access response message from a Physical Downlink Shared Channel (PDSCH). Thereafter, the UE determines whether random access response information instructed thereto exists in the random access response message.

Whether random access response information instructed to the UE exists may be determined by whether a Random Access Preamble ID (RAID) of a preamble transmitted by the UE exists.

The random access response information includes Timing Alignment (TA) representing timing offset information for synchronization, radio resource allocation information used in an uplink, and a temporary identifier (e.g., Temporary C-RNTI) for distinguishing an UE.

Thereafter, in order to request RRC connection establishment with the eNB, the UE transmits an RRC connection request message to the eNB (S1310).

The RRC connection request message may include S-TMIS and a cause field.

The cause field may include information representing an object that transmits an RRC connection request message, and the object may represent an uplink resource allocation request for a low latency service (e.g., mobile originating urgent, mobile terminating urgent).

Thereafter, the UE receives an RRC connection setup message corresponding to a response to the RRC connection Request message from the eNB (S1312).

The RRC connection setup message may include an UL resource response IE representing result information or response information about an uplink resource allocation request of the UE.

Further, the eNB may perform uplink resource allocation of the UE based on the UL resource request IE received from the UE.

The UE transmits an RRC connection setup complete message through an uplink resource allocated from the eNB (S1314).

The eNB, having received the RRC connection setup complete message notifies access of the UE while transmitting a service request message to the MME (S1316).

The MME, having received the service request message transmits context information of the UE including security information of the UE, data bearer information in which the UE uses, information about a serving gateway in which the eNB should transfer data sent by the UE, i.e., S1-U UL information (uplink bearer) GPRS Tunneling Protocol (GTP) tunnel ID (TEID) of the UE and an IP address of a serving gateway), and mobility management information of the UE to the eNB through an initial context setup request message (S1318).

Thereafter, for Access Stratum (AS) security and data bearer setup, the eNB transmits a security mode command and an RRC connection reconfiguration message to the UE (S1320).

The eNB interlocks with the UE based on context information of the UE received from the MME to set Access Stratum (AS) security and data bearer between the UE and the eNB.

When the AC security and data bearer setup is completed, the UE transmits security mode complete and RRC connection reconfiguration complete messages to the eNB (S1322).

Thereafter, the eNB notifies the MME that a context of the UE and data bearer setup have been successfully performed through an initial context setup response message (S1324).

In such an idle state, as shown in FIG. 13, as a conversion time to a connection mode according to RRC connection setup and data connection setup, a time of 35.5 ms is consumed for RRC connection setup and a time of 49.5 ms is consumed for security setup and data connection setup of a radio link (including no backhaul transmitting time).

Further, the UE converted to a connected state should request a radio resource for transmitting uplink data through a scheduling request, as shown in FIG. 14(a) or should request a radio resource for transmitting uplink data through a scheduling request and a buffer state report, as shown in FIG. 14(b).

In this case, in a case of FIG. 14(a), data transmission delay becomes 9.5 ms, and in a case of FIG. 14(b), data transmission delay becomes 17.5 ms.

Therefore, as shown in FIGS. 13 and 14, a time in which the UE in an idle state consumes for data transmission becomes 94 ms or 102.5 ms, which is the sum of 85 ms, which is a state conversion time of the UE for data transmission and reception and 9.5 ms or 17.5 ms, which is a radio resource occupation and data transmission time of the UE converted to a connected state.

However, there is a problem that such a consumption time has large delay in providing a low latency service that should quickly transmit information about various real time application services such as health care, traffic safety, disaster safety, and remote medical control, particularly, a specific event such as an accident or a state that may occur at a time that cannot be estimated by various end users such as a person or a machine (e.g., vehicle, sensor) to an eNB or a peripheral UE/user.

Accordingly, in order to solve such a problem, there is proposed a method for a UE to be capable of transmitting and receiving data without switching to the connected state in the idle state in which data transmission latency of about 5 times is generated compared to a UE in the connected state.

FIG. 15 is a diagram showing a connectionless mode capable of data transmission and reception in the idle state to which the present invention may be applied.

Referring to FIG. 15, in order to transmit and receive data for providing low latency service, a UE in the idle state can transmit and receive data in the connectionless mode of the idle state without switching to the connection-oriented mode of the connected state.

The connectionless mode refers to the state in which a UE can transmit and receive data for providing low latency service even in the idle state. Accordingly, the UE can transmit and receive data for providing low latency service even without switching to a separate connected state, so delay for state transition is not generated.

A detailed method for transmitting data in the connectionless mode is described in detail below.

Figure 16:
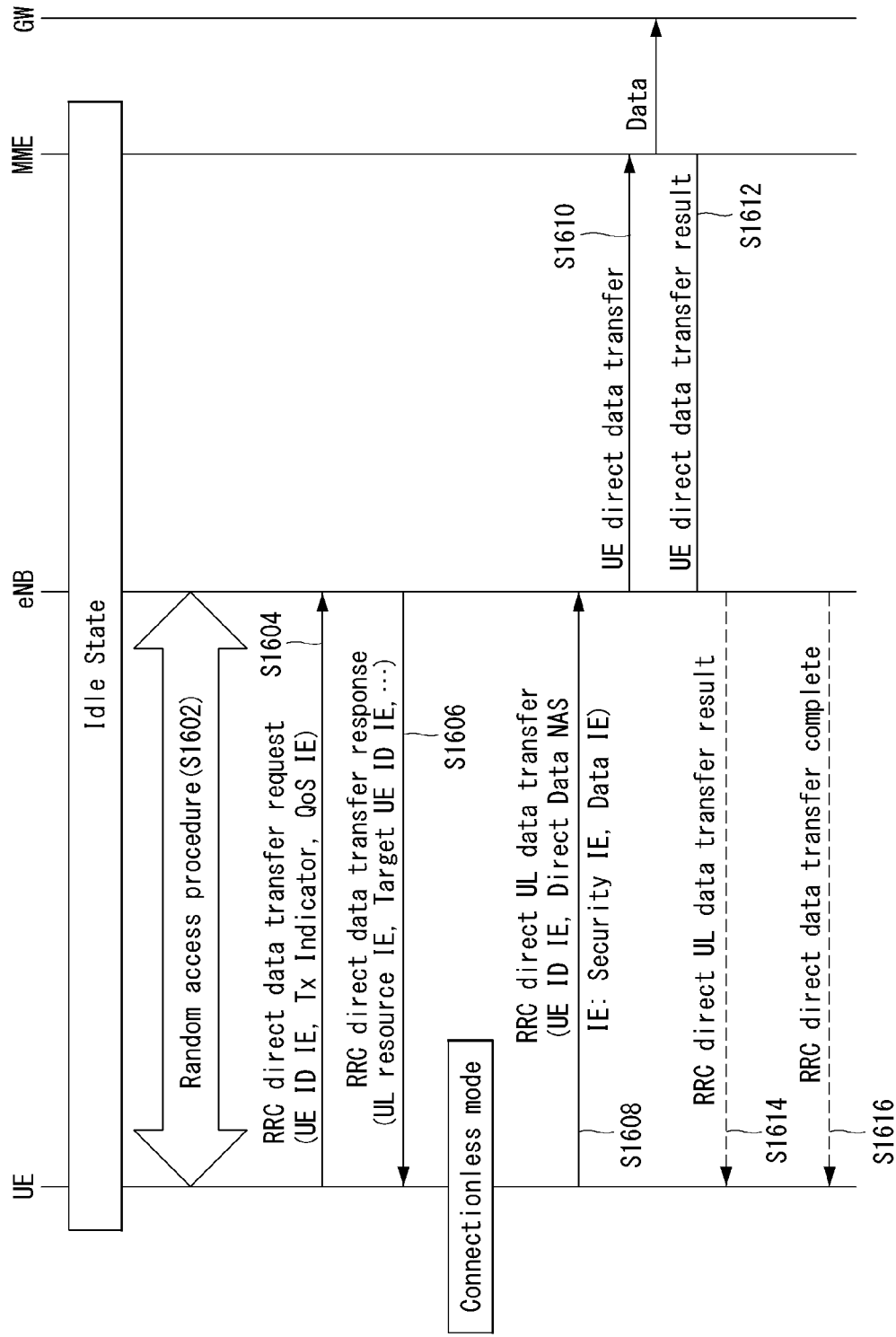
FIG. 16 is a flowchart showing an example in which low latency data is transmitted and received in the idle state to which the present invention may be applied.

FIG. 16 is a flowchart showing an example in which low latency data is transmitted and received in the idle state to which the present invention may be applied.

Referring to FIG. 16, a UE may transmit data for providing low latency service to a gateway (GW) through an eNB in the idle state.

This is described in detail, the UE performs the random access procedure, described in FIG. 13, with the eNB (S1602). That is, the UE transmits a random access preamble to the eNB. When the random access preamble is received, the eNB transmits a random access response message to the UE.

Specifically, DL scheduling information for the random access response message may be CRC-masked as a random access-radio network temporary identifier (RA-RNTI) and transmitted on an L1 or L2 control channel (PDCCH). The UE that has received a DL scheduling signal masked as the RA-RNTI may receive the random access response message from a physical downlink shared channel (PDSCH) and decode the message. Thereafter, the UE checks whether random access response information indicated therefor is present in the random access response message.

Whether random access response information indicated therefor is present or not may be checked based on whether a random access preamble ID (RAID) for the preamble transmitted by the UE is present or not.

The random access response information includes timing alignment (TA) indicative of timing option information for synchronization, radio resource allocation information used for the uplink, and a temporary identifier (e.g., a temporary C-RNTI)) for UE identification.

In this process, the UE requests UL data transfer in the connectionless mode by transmitting an RRC Direct Data Transfer Request message (or request message) to the eNB through allocated resources (S1604).

The RRC direct data Transfer message may include a message type field indicative of a message type, a UE ID IE field indicative of a UE ID for identifying a UE, a Tx indicator indicating whether the RRC direct data Transfer message is a message for data transmission or a message for data reception, and a quality of service information element (QoS IE) field indicative of the characteristics of data to be transmitted if the message is a request (i.e., UL data) for data transmission.

The UE ID IE may include an MME identifier that manages the UE and an identifier that identifies the UE within the corresponding MME. More specifically, the UE ID IE may include at least one of a public land mobile network identifier (PLMN ID) that is an operator network identification number, an MME group identifier (MMEGI) that is an MME group identifier, MME code (MMEC) indicative of an MME code ID, an MME temporary mobile subscriber identity (T-TMSI) indicative of a UE ID, a parameter indicative of an identifier allocated by an MME supporting which communication technology, and a parameter indicative of an identifier allocated by another entity other than the MME.

If a direct communication path (e.g., S1 interface) is not present between an MME corresponding to the MME identifier and the eNB, the eNB may request authentication and context information processing for the UE from another MME. The MME and another MME may exchange context information about the UE.

The QoS IE field may include fields for indicating the characteristics of data to be transmitted, and may include at least one of a QoS class identity (QCI) as in Table 1 or acceptable required packet delay as in Table 2 or a data size indicative of the size of an RRC direct data Transfer message including the data.

Table 1 is a table showing an example of the QCI.

TABLE 1

| QCI | Resource Type | Priority Level | Packet Delay Budget | Packet Error Loss Rate | Example Services |
|---|---|---|---|---|---|
| 1 | GBR | 2 | 100 ms | 10-2 | Conversational Voice |
| 2 | | 4 | 150 ms | 10-3 | Conversational Video (Live Streaming) |
| 3 | | 3 | 50 ms | 10-3 | Real Time Gaming |
| 4 | | 5 | 300 ms | 10-6 | Non-Conversational Video (Buffered Streaming) |
| 65 | | 0.7 | 75 ms | 10-2 | Mission Critical user plane Push To Talk voice (e.g., MCPTT) |
| 66 | | 2 | 100 ms | 10-2 | Non-Mission-Critical user plane Push To Talk voice |
| 5 | Non-GBR | 1 | 100 ms | 10-6 | IMS Signalling |
| 6 | | 6 | 300 ms | 10-6 | Video (Buffered Streaming), TCP-based (e.g., www, e-mail, chat, ftp, p2p file sharing, progressive video, etc.) |
| 7 | | 7 | 100 ms | 10-3 | Voice, Video (Live Streaming), Interactive Gaming |
| 8 | | 8 | 300 ms | 10-6 | Video (Buffered Streaming), TCP-based (e.g., www, e-mail, chat, ftp, p2p file, sharing, progressive video, etc.) |
| 9 | | 9 | | | |
| 69 | | 0.5 | 60 ms | 10-6 | Mission Critical delay sensitive signalling (e.g., MC-PTT signalling) |
| 70 | | 5.5 | 20 ms | 10-6 | Mission Critical Data (e.g. example services are the same as QCI 6/8/9) |

Table 2 is a table showing an example of a required packet delay.

TABLE 2

| Required packet delay | Descriptions |
| --- | --- |
| 000 | 10 ms |
| 001 | 20 ms |
| 010 | 30 ms |
| 011 | 50 ms |
| 100 | 60 ms |
| 101 | 75 ms |
| 110 | 100 ms |

The eNB may be aware that the UE tries to transmit UL data in the connectionless mode and the QoS IE field has been included through the Tx indicator received through the request message.

For example, if the Tx indicator has a value of "1", the eNB may be aware that the UE tries to transmit the UL data in the connectionless mode and the request message has included the QoS IE field.

The eNB may determine a resource allocation time and a resource allocation size based on information of the QoS IE field corresponding to the data to be transmitted by the UE, that is, transmission urgency according to a QCI, required packet delay or a data size. The eNB includes an UL resource IE indicative of corresponding resource allocation information in an RRC Direct Data Transfer Response message (or response message) and transmits the response message to the UE (S1606).

In this case, in the random access process, there may be a plurality of UEs that have selected the same resources and random access code (or preamble). The response message may include a target UE ID IE field indicating that the allocated resources have been allocated to which UE.

The target UE ID IE field may include one or more fields including the UE ID IE received at step S1604.

Table 3 is a table showing an example of the data format of the response message.

TABLE 3

| Oct 1 | Target UE ID IE |
| --- | --- |
| Oct 2 | Target UE ID IE |
| Oct 3 | Target UE ID IE |
| Oct 4 | Target UE ID IE |
| Oct 5 | Target UE ID IE |
| Oct 6 | UL Resource IE |
| Oct 7 | UL Resource IE |

After receiving the RRC Direct Data Transfer Response message, the UE switches to the connectionless mode described in FIG. 15 for data transmission and reception.

After switching to the connectionless mode, the UE transmits an RRC Direct UL Data Transfer message (or transfer message to the eNB through the allocated resources (S1608).

The RRC Direct UL Data Transfer message may include a UE ID IE field indicative of a UE ID for identifying the UE and a direct data NAS IE field indicative of data to be transmitted to the MME.

The UE ID IE field may include an MME identifier that manages the UE and an identifier that identifies the UE within the corresponding MME. More specifically, the MME identifier may include at least one of a public land mobile network identifier (PLMN ID) that is an operator network identification number, an MME group identifier (MMEGI) that is an MME group identifier, MME code (MMEC) indicative of an MME code ID, an M-TMSI that is a UE ID, a parameter that identifies an identifier allocated by an MME supporting which communication technology (e.g., 2G, 3G, LTE or LTE-A) and a parameter indicative of an identifier allocated by another entity other than the MME. The UE ID IE may not include the field transmitted at step S1604.

The direct data NAS IE field may include a Security IE field and a Data IE field.

The Security IE field may include at least one of a Security header type indicating whether security has been applied to the Data IE field, a key set identifier for identifying EPS security Context, an NAS count and message authentication code (MAC) for determining integrity.

The Security header Type may indicate one of "Not security protected" indicating that security has not been applied, "Integrity Protected" indicating that only integrity protection has been applied, and "Integrity protected and ciphered" indicating that both integrity protection and ciphering have been applied based on security that has been applied.

The Data IE field may include data to be transmitted by the UE and an EPS bearer ID corresponding to the data.

Thereafter, the eNB includes the UE ID IE and the direct data NAS IE field in a UE Direct Data Transfer message and transmits the message to the MME (S1610).

The MME may decipher the integrity (validity) check of the UE and the encrypted Data IE field based on information included in the Security IE field received from the eNB, and may determine whether the data has been transmitted to the gateway based on a result of the deciphering.

That is, if the UE is valid, the MME transmits an EPS bearer ID, a tunnel identifier and the data of the UE to a gateway corresponding to the EPS bearer ID included in the Data IE field, and may notify the eNB that the data of the UE has been transmitted through a UE Direct Data Transfer Result message (or result message).

If the UE is not valid, however, the MME may notify the eNB that the data transmission has failed through the UE Direct Data Transfer Result message. The UE Direct Data Transfer Result message may include a Cause field indicative of a failure cause (e.g., an invalid UE—authentication failure/deciphering failure, an invalid EPS bearer ID) (S1612).

The eNB may notify the UE of the results of the data transmission of the UE received from the MME through an RRC Direct UL Data Transfer Result message (or Result message) (S1614).

Thereafter, the eNB notifies the UE that the data transfer procedure has been completed by transmitting the RRC Direct Data Transfer Complete message (S1616).

The UE ID (e.g., temporary C-RNTI) obtained at step S1602 may be released by the transmission and reception of the RRC Direct UL Data Transfer Result message or the RRC Direct Data Transfer Complete message. In this case, a point of time at which the UE ID is released may be a point of time at which the messages are transmitted and received, a point of time after a predefined valid period, or a point of time after the time explicitly included in a corresponding message.

In the present embodiment, step S1612 and step S1616 may be omitted.

Through such a method, a UE can transmit and receive data without a latency time wasted in a connection process because it can transmit and receive UL data or DL data through the connectionless mode even in the idle state.

FIG. 17 is a diagram showing an example in which the connectionless mode switches to the connection-oriented mode to which the present invention may be applied.

Referring to FIG. 17, a UE in the connectionless mode of the idle state may switch to the connected state for additional data transmission and reception.

Specifically, a UE in the connectionless mode of the idle state needs to switch to the connection-oriented mode of the connected state in the following situation.

- if data or signaling to be transmitted to a corresponding UE is generated in a network
- if data or signaling (e.g., tracking area updating—an inter-system change, a load balancing TAU, an EPS bearer context change, a network capability information change or a DRX parameter change) of different characteristics is generated in a corresponding UE
- if data subsequent to data transmitted in the connectionless mode is generated as in (a) of FIG. 17, for example,
  - (i) if approval for a group travelling request waits or (ii) if information collection for a change of a line or transmission and reception data for change indication is generated The above situations are examples. If such a situation is generated, a UE needs to switch from the connectionless mode of the idle state to the connection-oriented mode of the connected state as shown in (b) of FIG. 17.

In an embodiment illustrating a method for a UE to switch from the connectionless mode to the connection-oriented mode, it is assumed that the UE has already been registered with a network and EPS bearer information corresponding to data to be transmitted is already present in the network.

Figure 18:
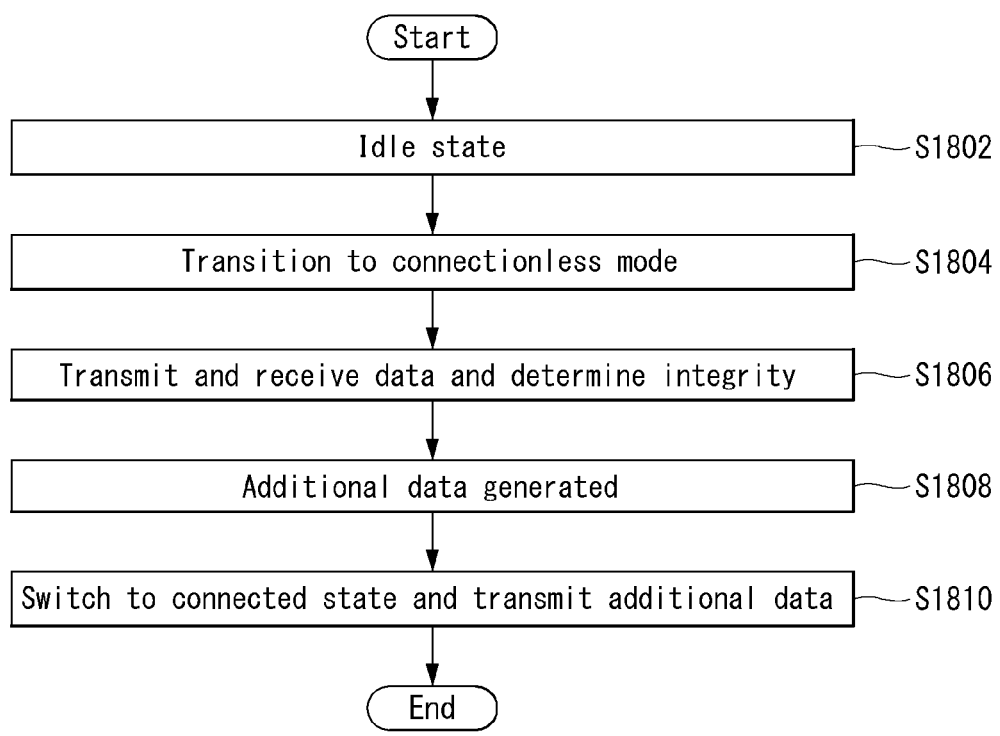
FIG. 18 is a flowchart schematically showing an example in which the connectionless mode switches to the connection-oriented mode to which the present invention may be applied.

FIG. 18 is a flowchart schematically showing an example in which the connectionless mode switches to the connection-oriented mode to which the present invention may be applied.

Referring to FIG. 18, if a UE in the connectionless mode of the idle state has additional data or subsequent data generated after data transmission, the UE may switch to the connection-oriented mode of the connected state and may transmit and receive the additional data or subsequent data.

Specifically, if the RRC layer of a UE has not been logically connected to the RRC layer of an E-UTRAN and the NAS layer of the UE has not been logically connected to the NAS layer of an MME, the UE is in the idle state (S1802).

The idle state, as described in FIG. 15, may include an idle mode (first mode) in which data transmission and reception are impossible and a connectionless mode (second mode) in which data for providing low latency service can be transmitted and received.

The UE is in the idle mode of the idle state, and then switches to the connectionless mode of the idle state if data transmission and reception are necessary in order to provide low latency service (S1804).

Thereafter, data transmission and reception for providing low latency service and the integrity determination procedure of the UE may be performed (S1806). In this case, the data transmission and reception may be performed prior to the integrity determination procedure of the UE or may be performed after the integrity determination procedure.

Furthermore, the integrity determination procedure may be performed by an eNB or an MME and described in detail below.

After the data transmission and reception for providing low latency service and the integrity determination, when the additional data or subsequent data described in FIG. 17 is generated, the UE needs to switch to the connected state (S1808).

Accordingly, the UE switches to the connected state by performing a procedure for switching to the connected state, and may transmit and receive the additional data or subsequent data (S1810).

Figure 19:
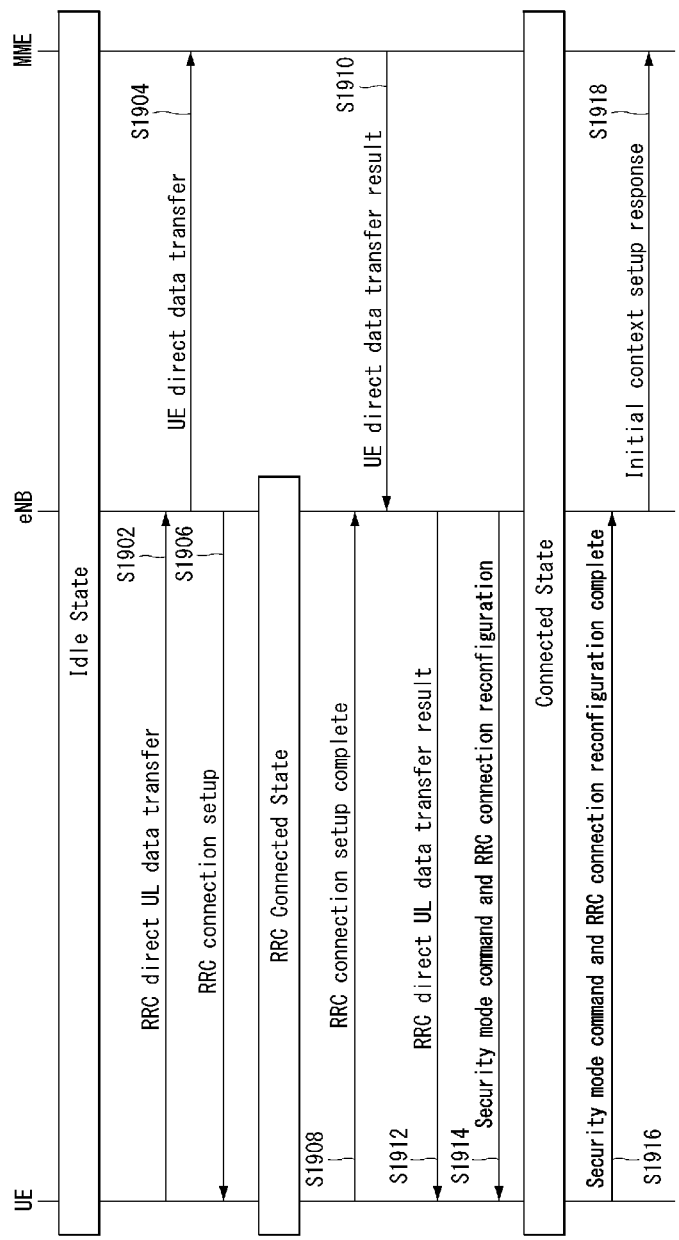
FIG. 19 is a flowchart showing an example in which the connectionless mode switches to the connection-oriented mode when transmitting data prior to the integrity verification of a UE to which the present invention may be applied.

FIG. 19 is a flowchart showing an example in which the connectionless mode switches to the connection-oriented mode when transmitting data prior to the integrity verification of a UE to which the present invention may be applied.

Referring to FIG. 19, a UE may transmit data in the connectionless mode through contention resources, may request transition to the connection-oriented mode, and may switch to the connection-oriented mode.

This is described in detail. If the UE in the idle state transmits data in order to provide low latency service, it may transmit an RRC Direct UL Data Transfer message (or request message) to an eNB (S1902).

In this case, if the UE requires transition to the connected state for the cause described in FIG. 17, the UE may request transition to the connection-oriented mode of the connected state from the eNB through the RRC Direct UL Data Transfer message.

The RRC Direct UL Data Transfer message may further include a Mode Transition IE field indicating that the UE requests mode transition from the eNB in addition to the fields described in FIG. 16.

The Mode Transition IE field may further include a mode transition indicator indicating whether the UE has requested transition to the connection-oriented mode and a mode transition cause field indicative of a cause for the transition to the connection-oriented mode (e.g., emergency, highPriorityAccess, mt-Access, mo-Signalling, mo-Data, delayTolerantAccess, enhanemergency, mt-TimeCriticalDatama or mo0TimeCriticalData).

After receiving the RRC Direct UL Data Transfer message, the eNB can be aware that the UE requests transition to the connection-oriented mode of the connected state through the mode transition indicator included in the message (e.g., if the mode transition indicator has a value of "1", it may mean a mode transition request).

In order to perform an RRC connection setup procedure with the UE, the eNB may include information and a field, included in the RRC Direct UL Data Transfer message, in a UE Direct Data Transfer message, and may transmit the UE Direct Data Transfer message to an MME (S1904).

The UE Direct Data Transfer message may be transmitted using an S1 Application protocol between the eNB and the MME.

Thereafter, in order to perform the RRC connection setup procedure, the eNB may transmit an RRC connection setup message to the UE (S1906). The UE may switch to the RRC connected state.

After switching to the RRC connected state, the UE may transmit an RRC Connection Setup Complete message to the eNB (S1908).

The MME may perform the integrity check of the UE and decipher the ciphered Data IE field based on information included in the Security IE field received from the eNB, and may determine whether data is to be transmitted to a gateway and the transition of the UE to the connected state based on a result of the integrity check and deciphering.

That is, if the UE is valid, the MME transmits an EPS bearer ID, tunnel identifier and the data of the UE to a gateway corresponding to an EPS bearer ID included in the Data IE field, and may notify the eNB that the data of the UE has been transmitted through a UE Direct Data Transfer Result message (or first result message). The MME may include a UE Context Setup Request IE field in the UE Direct Data Transfer Result message, and may request the ECM and data connection setup of the UE from the eNB (S1910).

The UE context setup request IE field may include one or more of a context setup request indicator indicating whether ECM and data connection setup have been requested and information related to a data connection (e.g., a UE aggregate Maximum Bit Rate, E-RAB) and information related to security setup (UE Security Capabilities, Security Key), such as Table 4.

TABLE 4

| IE Name | Descriptions |
| --- | --- |
| MME UE S1AP ID | Uniquely identifies the UE association over the S1 interface within the MME |
| eNB UE S1AP ID | Uniquely identifies the UE association over the S1 interface within the eNB |
| E-RAB Setup List | |
| E-RAB ID | Uniquely identifies a radio access bearer for a particular UE |
| E-RAB Level QoS Parameter | Defines the QoS (e.g., QoS Class Identifier, Allocation and Retention Priority) to be applied to an E-RAB. |
| Transport Layer Address | IP address of the eNB |
| GTP-TEID | GTP Tunnel Endpoint Identifier to be used for the user plane transport |
| UE Security Capabilities | Defines the supported algorithms for ciphering and integrity protection in the UE. |
| Security Key | Used to apply security in the eNB |

However, if the UE is not valid, the MME may notify the eNB that the data transmission has failed through the UE Direct Data Transfer Result message. The UE Direct Data Transfer Result message may include a Cause field indicative of a failure cause (e.g., an invalid UE—an authentication failure/deciphering failure and an invalid EPS bearer ID). The context setup request indicator of the UE context setup request IE field may be set to "0" or the UE Direct Data Transfer Result message may not include the UE context setup request IE field.

The eNB may notify the UE of the data transmission results of the UE received from the MME through an RRC Direct UL Data Transfer Result message (or second result message) (S1912).

If the UE is valid, the eNB transmits a Security Mode Command & RRC Connection Reconfiguration message to the UE for a security configuration and data connection setup (S1914), and may configure security for a radio link, an SRB2 and a data connection through the context information of the UE received from the MME.

Thereafter, the UE switches to the connection-oriented mode of the connected state, and transmits a Security Mode Command & RRC Connection Reconfiguration Complete message to the eNB (S1916). The eNB may transmit a response (e.g., an initial context setup response message) to the ECM and data connection setup request to the MME (S1918).

Through such a method, the UE may switch from the connectionless mode of the idle state to the connection-oriented mode of the connected state and can transmit and receive data.

Figure 20:
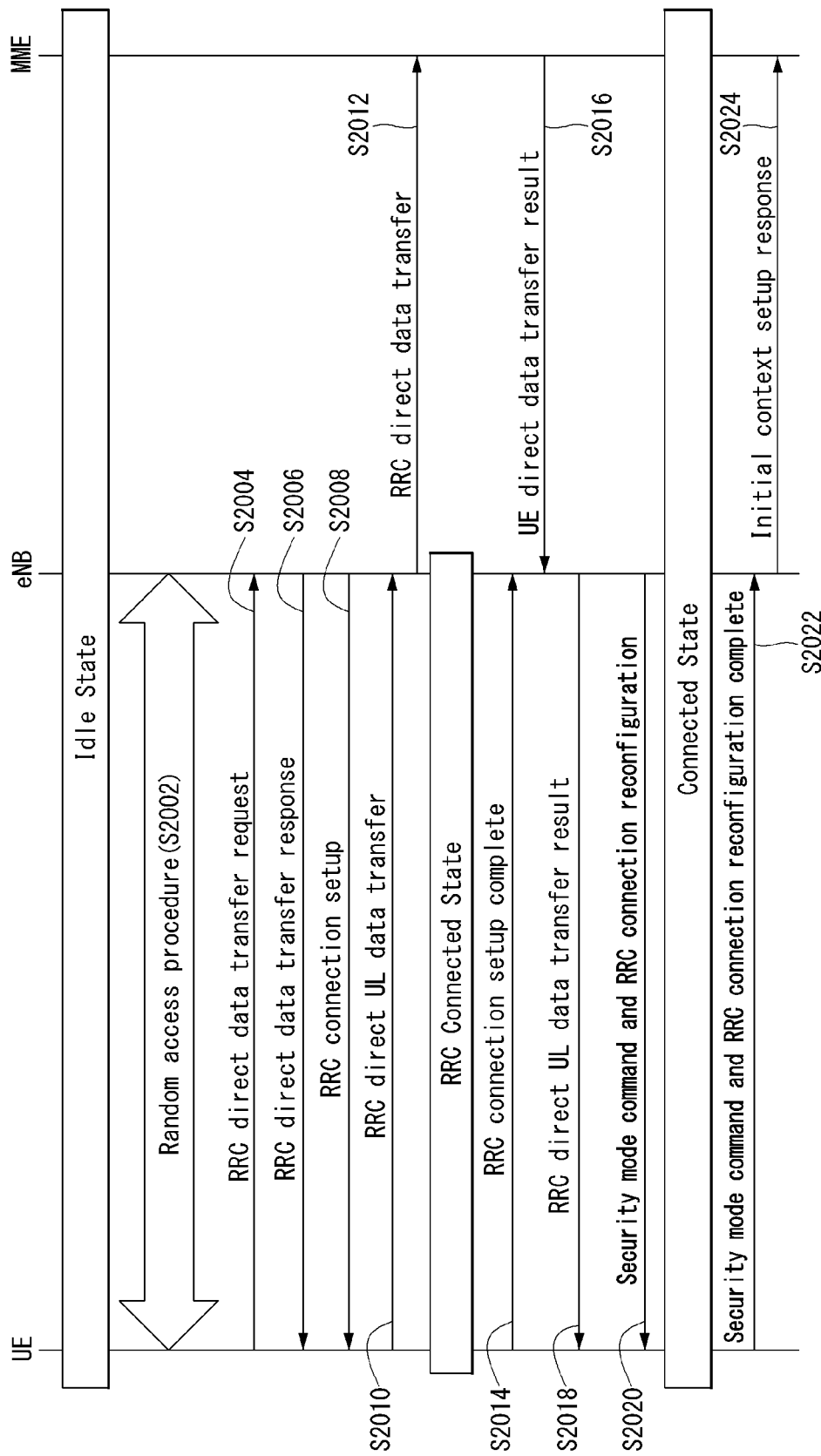
FIG. 20 is a flowchart showing another example in which the connectionless mode switches to the connection-oriented mode when transmitting data prior to the integrity verification of a UE to which the present invention may be applied.

FIG. 20 is a flowchart showing another example in which the connectionless mode switches to the connection-oriented mode when transmitting data prior to the integrity verification of a UE to which the present invention may be applied.

Referring to FIG. 20, a UE may request a connectionless-based data transmission and connected state transition through non-contention resources.

First, step S2002 is the same as step S1602 of FIG. 16, and a description thereof is omitted.

In the step (S2002) process, the UE requests UL data transfer in the connectionless mode and the connection-oriented mode of the connected state by transmitting an RRC Direct Data Transfer Request message (or request message) to an eNB through allocated resources (S2004).

The RRC Direct Data Transfer Request message may further include a Mode Transition IE field indicating that the UE requests mode transition from the eNB in addition to the fields described in FIG. 16.

The Mode Transition IE field may further include a mode transition indicator indicating whether the UE requests transition to the connection-oriented mode and a mode transition cause field indicative of a cause for the transition to the connection-oriented mode (e.g., emergency, highPriorityAccess, mt-Access, mo-Signalling, mo-Data, delayTolerantAccess, enhanemergency, mt-TimeCriticalDatam or mo0TimeCriticalData).

After receiving the RRC Direct Data Transfer Request message, the eNB may be aware that the UE requests transition to the connection-oriented mode of the connected state through the mode transition indicator included in the message (e.g., if the mode transition indicator has a value of "1", it may mean a mode transition request).

The eNB may determine a resource allocation time and resource allocation size based on information of a QoS IE field corresponding to data to be transmitted by the UE, that is, transmission urgency according to a QCI, required packet delay or a data size. The eNB includes an UL resource IE indicative of the corresponding resource allocation information in an RRC Direct Data Transfer Response message (or response message), and transmits the response message to the UE (S2006).

Thereafter, the eNB may transmit an RRC connection setup message to the UE in order to perform an RRC connection setup procedure (S2008). The UE may transmit an RRC Direct UL Data Transfer message (or transfer message) to the eNB in order to provide low latency service through the UL resources allocated at step S2006 (S2010).

The RRC direct data Transfer message may include the same fields as those of the RRC direct data Transfer message of FIG. 16.

In order to perform data transmission to an MME and form an ECM connection with the UE, the eNB includes the UE ID IE field, direct data NAS IE field or mode transfer IE field, received from the UE, in a UE Direct Data Transfer message, and transmits the transfer message to the MME (S2012). In this case, the UE Direct Data Transfer message may be transmitted using an S1 Application protocol between the eNB and the MME.

Thereafter, the UE may switch to the RRC connected state and transmit an RRC Connection Setup Complete message to the eNB in order to notify the eNB that the RRC connection setup has been completed (S2014).

The MME may perform the integrity check of the UE and decipher the ciphered Data IE field based on the information and field included in the Security IE field of the message received from the eNB, and may determine whether or not to transmit the data to a gateway and transition to the connected state of the UE based on a result of the integrity check and deciphering.

That is, if the UE is valid, the MME may transmit an EPS bearer ID, tunnel identifier and the data of the UE to a gateway corresponding to an EPS bearer ID included in the Data IE field, and may notify the eNB that the data of the UE has been transmitted through a UE Direct Data Transfer Result message (or first result message). The MME may include a UE Context Setup Request IE field in the Direct Data Transfer Result message and request the ECM and data connection setup of the UE from the eNB (S2016).

The UE context setup request IE field may include one or more of a context setup request indicator indicating whether an ECM and data connection setup request has been made, information (e.g., a UE aggregate Maximum Bit Rate or E-RAB) related to a data connection, such as that of Table 4, and information (UE Security Capabilities and Security Key) related to a security configuration.

Thereafter, step S2018 to step S2024 are the same as step S1912 to step S1918 of FIG. 19, and a description thereof is omitted.

Figure 21:
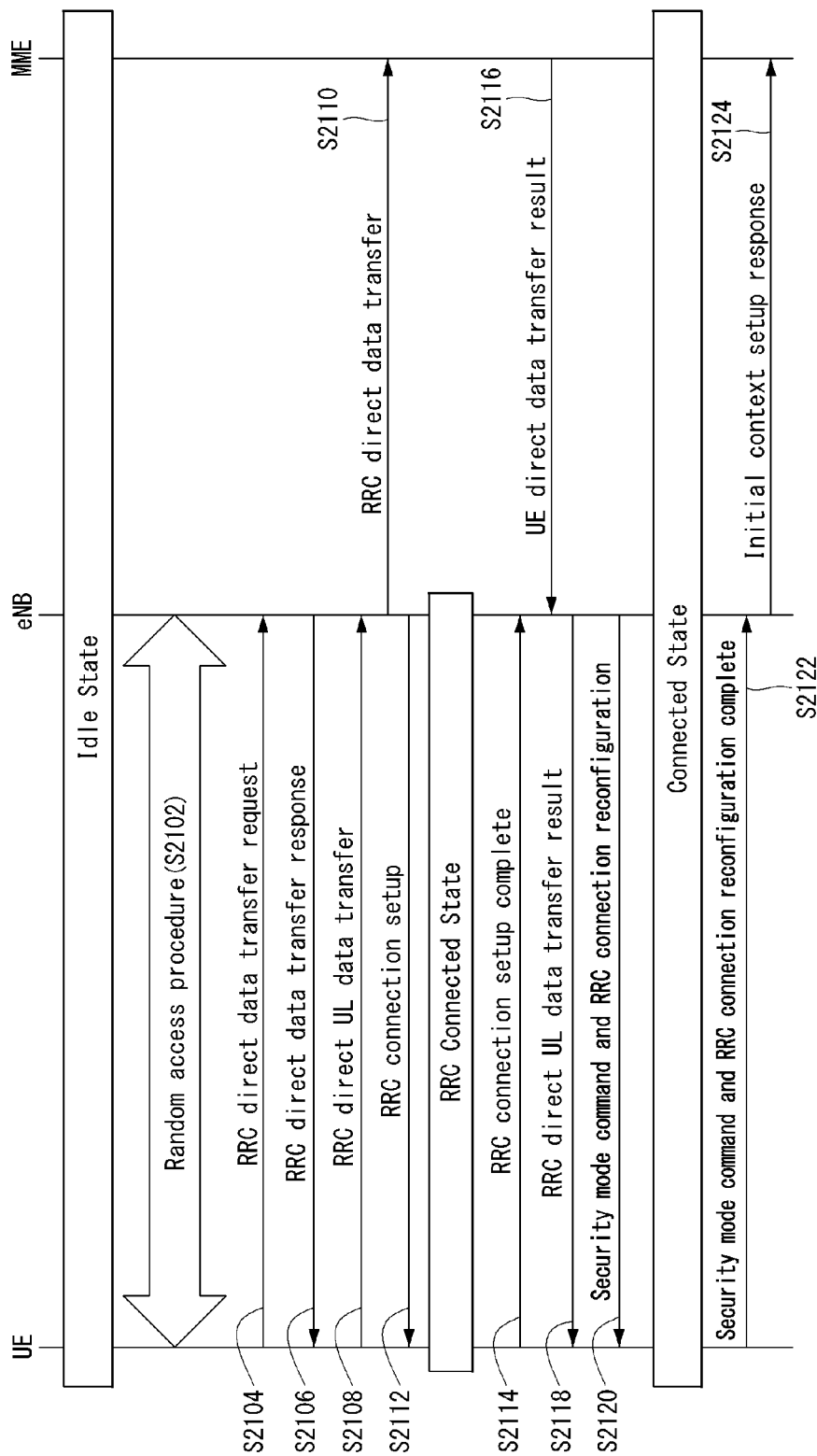
FIG. 21 is a flowchart showing another example in which the connectionless mode switches to the connection-oriented mode when transmitting data prior to the integrity verification of a UE to which the present invention may be applied.

FIG. 21 is a flowchart showing another example in which the connectionless mode switches to the connection-oriented mode when transmitting data prior to the integrity verification of a UE to which the present invention may be applied.

Referring to FIG. 21, when additional data is generated or other causes are generated in a process for a UE in the connectionless mode to transmit data in order to provide low latency service through non-contention resources, the UE may switch to the connection-oriented mode of the connected state by transmitting a request message to an eNB.

First, step S2102 to step S2106 are the same as step S1602 to step S1606 of FIG. 16, and a description thereof is omitted.

Thereafter, the UE may include data for providing low latency service in an RRC Direct UL Data Transfer message (or request message) in order to provide the low latency service to the eNB through the UL transmission resources allocated at step S2106, and may transmit the request message to the eNB (S2108).

In this case, if the UE needs transition to the connected state due to the cause described in FIG. 17, the UE may request transition to the connection-oriented mode of the connected state from the eNB through an RRC Direct UL Data Transfer message.

The RRC Direct UL Data Transfer message may further include a Mode Transition IE field indicating that the UE requests mode transition from the eNB in addition to the fields described in FIG. 16.

The Mode Transition IE field may further include a mode transition indicator indicating whether the UE requests transition to the connected-oriented mode and a mode transition cause field indicative of a cause for the transition to the connection-oriented mode (e.g., emergency, highPriorityAccess, mt-Access, mo-Signalling, mo-Data, delayTolerantAccess, enhanemergency, mt-TimeCriticalDatam or mo0TimeCriticalData).

After receiving the RRC Direct UL Data Transfer message, the eNB may be aware that the UE requests transition to the connection-oriented mode of the connected state through the mode transition indicator included in the message (e.g., if the mode transition indicator has a value of "1", it may mean a mode transition request).

Step S2110 to step S2124 are the same as step S1904 to step S1918 of FIG. 19, and thus a description thereof is omitted.

Figure 22:
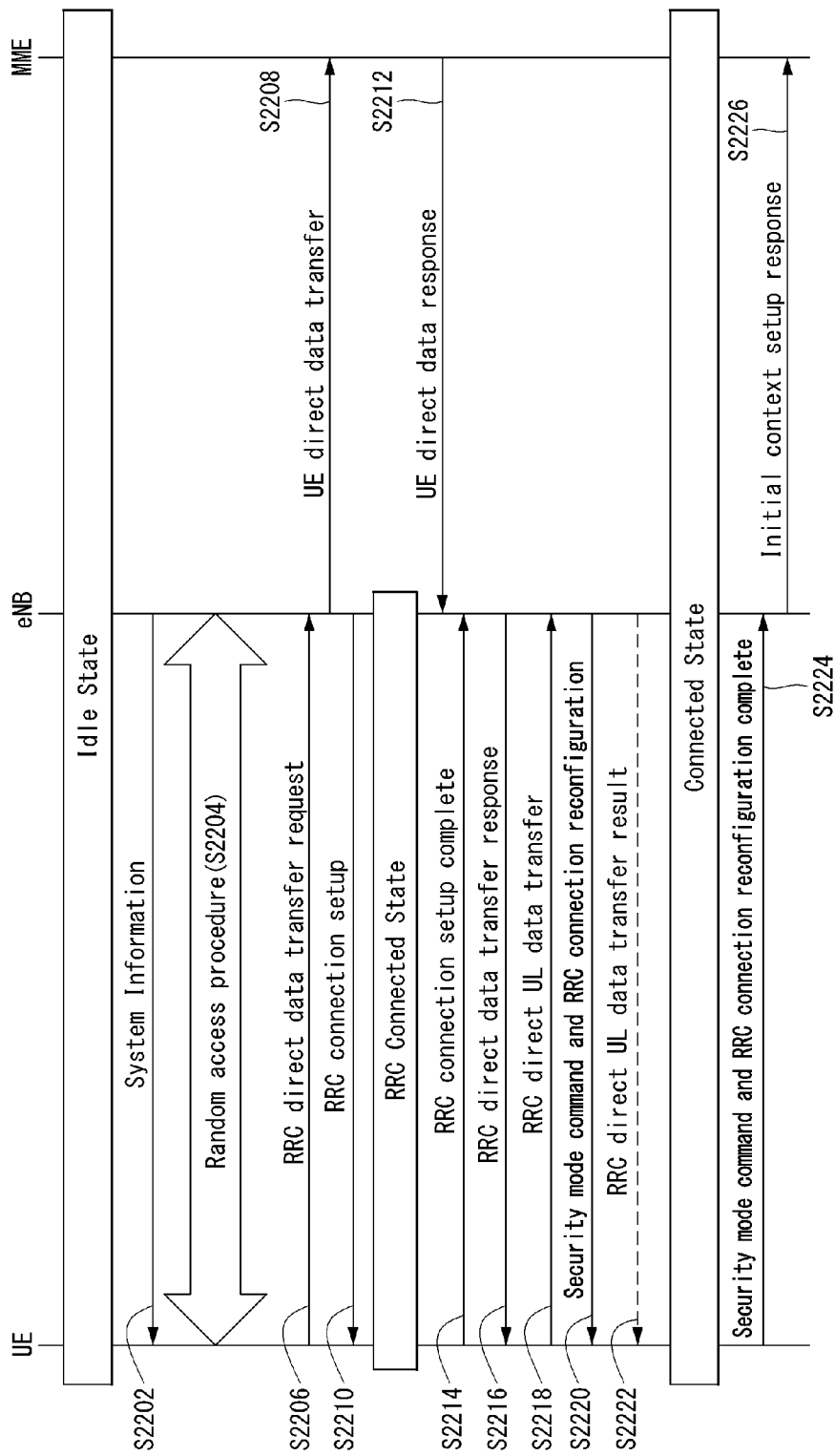
FIG. 22 is a flowchart showing another example in which the connectionless mode switches to the connection-oriented mode when transmitting data after the integrity verification of a UE to which the present invention may be applied.

FIG. 22 is a flowchart showing another example in which the connectionless mode switches to the connection-oriented mode when transmitting data after the integrity verification of a UE to which the present invention may be applied.

Referring to FIG. 22, if a UE in the connectionless mode needs transition to the connection-oriented mode of the connected state in a process of transmitting data after the integrity check of the UE in order to provide low latency service, the UE may switch to the connection-oriented mode of the connected state through a connection procedure.

Specifically, if a UE in the idle state needs data transmission and reception in the connectionless mode, the UE may receive system information necessary for the data transmission and reception from an eNB (S2202).

The eNB may include a DT Support field, that is, system information necessary for data transmission and reception in the connectionless mode, in a system information message, and may periodically transmit the system information message.

The DT Support field may include at least one of a field indicating whether the eNB supports connectionless-based data transmission and reception, a field including random access resource information for connectionless-based data transmission and reception use, and a field including a security algorithm supported by the eNB.

In this case, each field and information may be transmitted through the same system information message or may be transmitted through a system information message of a different cycle. For example, the information indicating whether the eNB supports connectionless-based transmission and reception may be transmitted through a system information message (e.g., a Master Information block) of a short cycle. The random access resource information for connectionless-based transmission and reception and the security algorithm may be transmitted through a system information message (e.g., System Information Block Type 2) in which random access resource information for common use is transmitted.

The UE that has received the DT support IE field through the system information message may perform the following operation based on each field value.

If the field indicating whether the eNB supports connectionless-based data transmission and reception indicates that the eNB does not support connectionless-based data transmission and reception, the UE requests resources for connection setup using random access resource information for common use. If the field indicates that the eNB does not support connectionless-based data transmission and reception, the UE requests resources for connectionless-based transmission from the eNB using random access resource information for common use or connectionless-based transmission and reception use.

Furthermore, if the UE selects the security algorithm, the UE may select one of ciphering algorithms (e.g., eea0, eea1, eea2, and eea3-v1130) and one of integrity guarantee algorithms (e.g., eia0-v920, eia1, eia2 and eia3-v1130) supported by the eNB.

The algorithms selected by the UE may be subsequently included in a message transmitted through step S2206 or step S2218 and may be transmitted to the eNB.

If the security algorithm is selected according to a predetermined rule, both the eNB and the UE may select ciphering and integrity guarantee algorithms according to the predetermined same rule.

Accordingly, in this case, it is not necessary to explicitly notify the eNB of the selected algorithm.

For example, if the eNB selects eea1 and eea3-v1130 as the ciphering algorithm, the UE supports eea1 and eea3-v1130, and an algorithm belonging to algorithms supported by both the eNB and the UE and having the greatest value has been configured to be selected, the eNB and the UE may select eea3-v1130 as the ciphering algorithm.

In this case, a ciphering algorithm type may be defined as an enumerated type so that it has eea0=1, eea1=2, eea2=3 and eea3-v1130=4dml values.

Thereafter, after the UE performs the random access procedure described in FIG. 16 along with the eNB (S2204), the UE transmits an RRC Direct Data Transfer Request message to the eNB for the purpose of a data transmission request and connection request (S2206).

The RRC direct transfer request message may include a UE ID IE field indicative of a message type and/or a UE ID, a Tx indicator indicating whether the message is for a request for data transmission, a direct data NAS IE field that is a message that has to be transmitted to the MME, a Mode Transition IE field indicating that the UE has to request mode transition from the eNB and/or a QoS IE field indicative of the characteristics of data to be transmitted.

The UE ID IE field may include an MME identifier that manages the UE and an identifier that identifies the UE within the corresponding MME. More specifically, the UE ID IE field may include at least one of a public land mobile network identifier (PLMN ID) that is an operator network identification number, an MME group identifier (MMEGI) that is an MME group identifier, MME code (MMEC) indicative of an MME code ID, an M-TMSI that is a UE ID, a parameter indicative of an identifier allocated by an MME supporting which communication technology, and a parameter indicative of an identifier allocated by another entity other than the MME.

The Tx indicator field may indicate whether the RRC direct data transmission request is a request for receiving data or a request for transmitting data. For example, if a value of the Tx indicator is "1", the Tx indicator field may indicate a data transmission request. If a value of the Tx indicator is "0", the Tx indicator field may indicate a request for data reception.

If the RRC Direct Data Transfer Request message is a data transmission request, the direct data NAS IE field may include a Security IE field for determining the integrity of the UE.

The Security IE field is the same as that described in FIG. 16. The QoS IE field may include an EPS bearer ID corresponding to data to be transmitted by the UE and a Direct Data Size field indicative of the size of the data.

The Mode Transition IE field may further include a mode transition indicator indicating whether the UE has requested transition to the connection-oriented mode and a mode transition cause field indicative of a cause transition to the connection-oriented mode (e.g., emergency, highPriorityAccess, mt-Access, mo-Signalling, mo-Data, delayTolerantAccess, enhanemergency, mt-TimeCriticalDatam or mo0TimeCriticalData).

After the eNB receives the RRC Direct Data Transfer Request message, the eNB may be aware that the UE has requested transition to the connection-oriented mode of the connected state through the mode transition indicator included in the transfer message (e.g., if the mode transition indicator has a value of "1", it may mean a mode transition request).

In order to perform a data transmission and connection setup procedure with the UE, the eNB may include information included in the UE ID IE field and the direct data NAS IE field, received from the UE, in a UE Direct Data Transfer message, and may transmit the UE Direct Data Transfer message to an MME (S2208).

The eNB may transmit an RRC connection setup message to the UE in order to perform the RRC connection setup procedure (S2210). The UE may switch to the RRC connected state. In this case, the RRC connection setup message may be transmitted prior to the UE Direct Data Transfer message of step S2208 according to the processing time of the message.

The MME performs an integrity check on the UE based on information included in the Security IE field included in the received UE Direct Data Transfer message.

If the UE is valid, the MME may transmit security-related information and data-related information corresponding to the EPS bearer ID of data to be transmitted by the UE to the eNB through a UE direct data response message (S2212).

The security-related information may include a ciphering algorithm supported by the UE, an integrity guarantee algorithm supported by the UE, and a default key (e.g., the $K_{eNB}$) for generating keys to be used for ciphering and integrity guarantee purposes by the AS.

The data-related information corresponding to the EPS bearer ID of the data to be transmitted by the UE may include an EPS bearer ID, QoS, size information of the data to be transmitted, and the address and tunnel ID of a gateway to which the data will be forwarded.

If the security algorithm is selected according to a predetermined rule as described above, the UE and the eNB may be aware that which algorithm will be used because the eNB can receive the ciphering and integrity guarantee algorithms supported by the UE from the MME.

If the UE is not valid, the MME includes a field indicative of an invalid cause in the UE direct data response message and transmits the response message to the eNB.

After the UE switches to the RRC connected state, it may transmit an RRC Connection Setup Complete message to the eNB (S2214)

When the eNB receives the UE direct data response message indicating that the UE is valid from the MME, the eNB may determine a resource allocation time and a resource allocation size based on data transmission urgency according to QoS (e.g., the aforementioned QCI or direct data size) corresponding to the EPD Bearer ID of data to be transmitted by the UE. The eNB includes an UL resource IE indicative of corresponding resource allocation information in an RRC Direct Data Transfer Response message (or response message), and transmits the response message to the UE (S2216).

In this case, since a plurality of UEs may select the same resources and random access code (or preamble) in the random access process, the response message may include a target UE ID IE field indicating that the allocated resources have been allocated to which UE.

The target UE ID IE field may include one or more fields including the UE ID IE received at step S2206, and may have the data format of Table 3.

The UE transmits an RRC Direct UL Data Transfer message (or transfer message) to the eNB through the allocated resources (S2218).

The RRC Direct UL Data Transfer message may include a direct data NAS IE field, that is, data that needs to be transmitted to a gateway.

The eNB decodes the RRC Direct UL Data Transfer message, checks integrity for the message, and determines whether or not to transmit the data to the gateway. That is, if the message is normal, the eNB may transmit the data corresponding to the EPS bearer ID of the data to the gateway.

The eNB transmits a Security Mode Command & RRC Connection Reconfiguration message to the UE for a security configuration and data connection setup (S2220), may configure security for a radio link, an SRB2 and a data connection through context information of the UE received from the MME, and may notify the UE that the data has been transmitted through an RRC Direct UL Data Transfer Result message (or result message) (S2222).

Thereafter, the UE switches to the connection-oriented mode of the connected state, and transmit a Security Mode Command & RRC Connection Reconfiguration Complete message to the eNB (S2224). The eNB may transmit a response (e.g., an initial context setup response message) to an ECM and data connection setup request to the MME (S2226).

Figure 23:
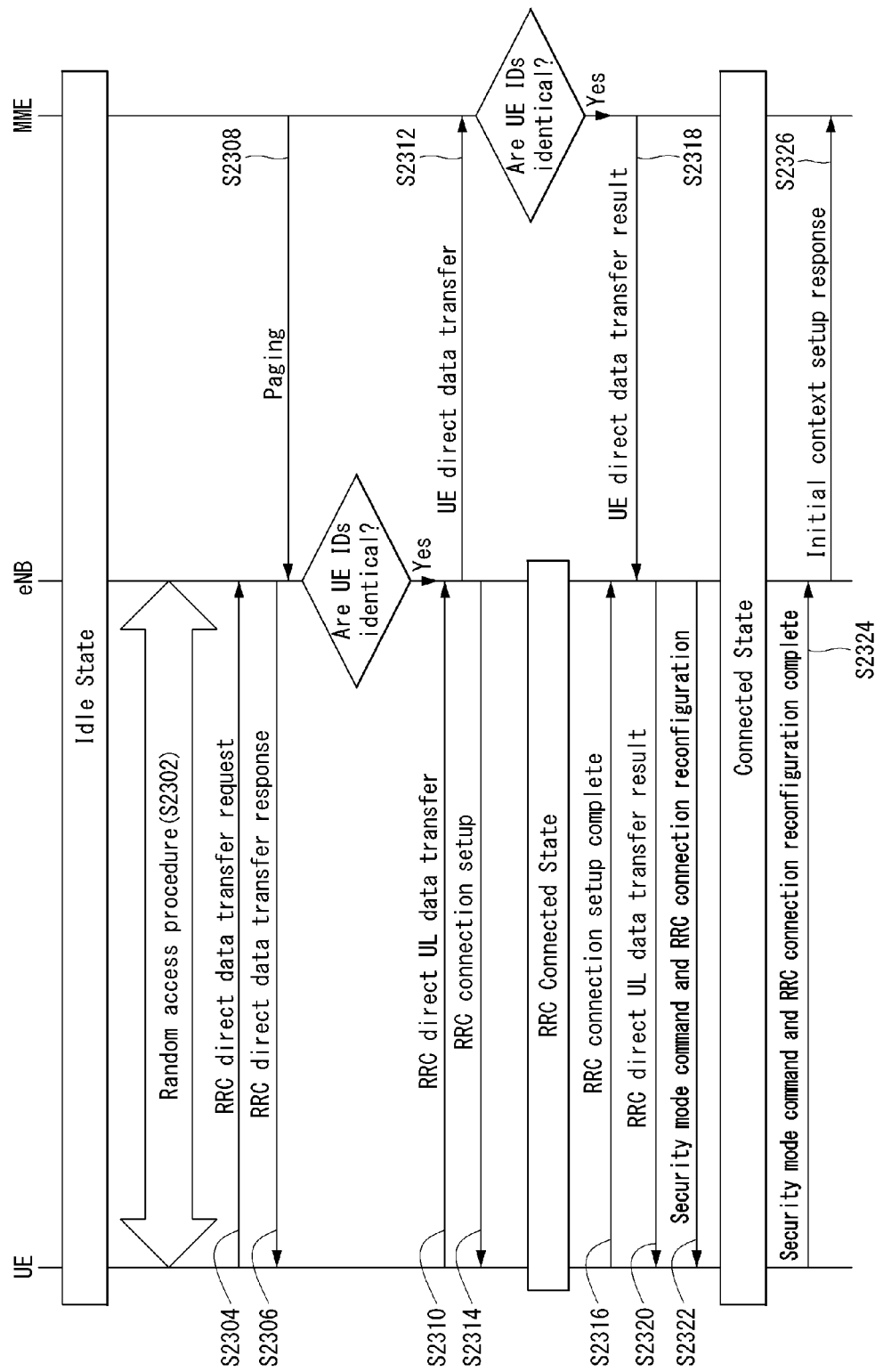
FIG. 23 is a flowchart showing an example in which a UE switches from the connectionless mode to the connection-oriented mode by an eNB to which the present invention may be applied.

FIG. 23 is a flowchart showing an example in which a UE switches from the connectionless mode to the connection-oriented mode by an eNB to which the present invention may be applied.

Referring to FIG. 23, if data is transmitted on a connectionless basis before the integrity of a UE is verified, the UE in the connectionless mode of the idle state may be made to switch to the connection-oriented mode of the connected state by an eNB.

First, step S2302 to step S2306 are the same as step S1602 to step S1606 of FIG. 16, and thus a description thereof is omitted.

Thereafter, the eNB may receive a paging message from an MME (S2308). The paging message may include a UE ID IE field including a UE ID indicative of a UE on which the eNB will perform a connection procedure.

The eNB may compare the UE ID of the UE ID IE field within the paging message transmitted by the MME with the RRC Direct Data Transfer Request message or the UE ID of the UE ID IE field of the RRC direct data Transfer message transmitted by the UE.

If, as a result of the comparison, the UE IDs are the same, the eNB may transmit an RRC connection setup message to the UE in order to perform a procedure for RRC connection setup, and step S2314 may be omitted.

If the RRC Direct Data Transfer Request message transmitted by the UE does not include the UE ID IE field indicative of the UE ID, the eNB compares a UE ID received from the UE with a UE ID received from the MME after step S2310, and performs a procedure for RRC connection setup.

In order to provide low latency service to the eNB through UL transmission resources allocated through step S2306, the UE may include data for providing low latency service in an RRC Direct UL Data Transfer message (or request message) and transmit the request message to the eNB (S2310).

The RRC Direct UL Data Transfer message may include a UE ID IE field indicative of a UE ID for identifying the UE and a direct data NAS IE field, that is, data that needs to be transmitted to the MME.

The UE ID IE field may include an MME identifier that manages the UE and an identifier that identifies the UE within the corresponding MME. More specifically, the UE ID IE field may include at least one of a public land mobile network identifier (PLMN ID) that is an operator network identification number, an MME group identifier (MMEGI) that is an MME group identifier, MME code (MMEC) indicative of an MME code ID, an M-TMSI that is a UE ID, a parameter indicative of an identifier allocated by an MME supporting which communication technology, and a parameter indicative of an identifier allocated by another entity other than the MME, and may not include the field transmitted at step S2304.

The direct data NAS IE field may include a Security IE field and a Data IE field.

The Security IE field may include at least one of a Security header type indicating whether security has been applied to the Data IE field, a key set identifier, for identifying EPS security Context, and message authentication code (MAC) for determining an NAS count or integrity.

The Security header Type may indicate one of "Not security protected" indicating that security has not been applied, "Integrity Protected" indicating that only integrity protection has been applied, and "Integrity protected and ciphered" indicating that both integrity protection and ciphering have been applied based on security that has been applied.

The Data IE field may include data to be transmitted by the UE and an EPS bearer ID corresponding to the data.

Thereafter, the eNB includes the UE ID IE and the direct data NAS IE field in a UE Direct Data Transfer message, and transmits the message to the MME (S2312).

The MME may perform the integrity check of the UE and decipher the ciphered Data IE field based on the information included in the Security IE field received from the eNB, and may determine whether or not to transmit the data to a gateway based on a result of the integrity check and deciphering.

The MME may compare a UE ID owned by the MME with the UE ID within the UE IE ID field received from the eNB. If, as a result of the comparison, the UE IDs are the same, the MME may include information for a security configuration and data path configuration for the UE in the UE Direct Data Transfer Result message of step S2318, and may transmit the message.

However, if the UE IDs are not the same, the MME may not transmit information necessary for the security configuration and data path configuration for the UE.

Step S2314 to step S2326 are the same as step 2112 to step S2124 of FIG. 21, and thus a description thereof is omitted.

Figure 24:
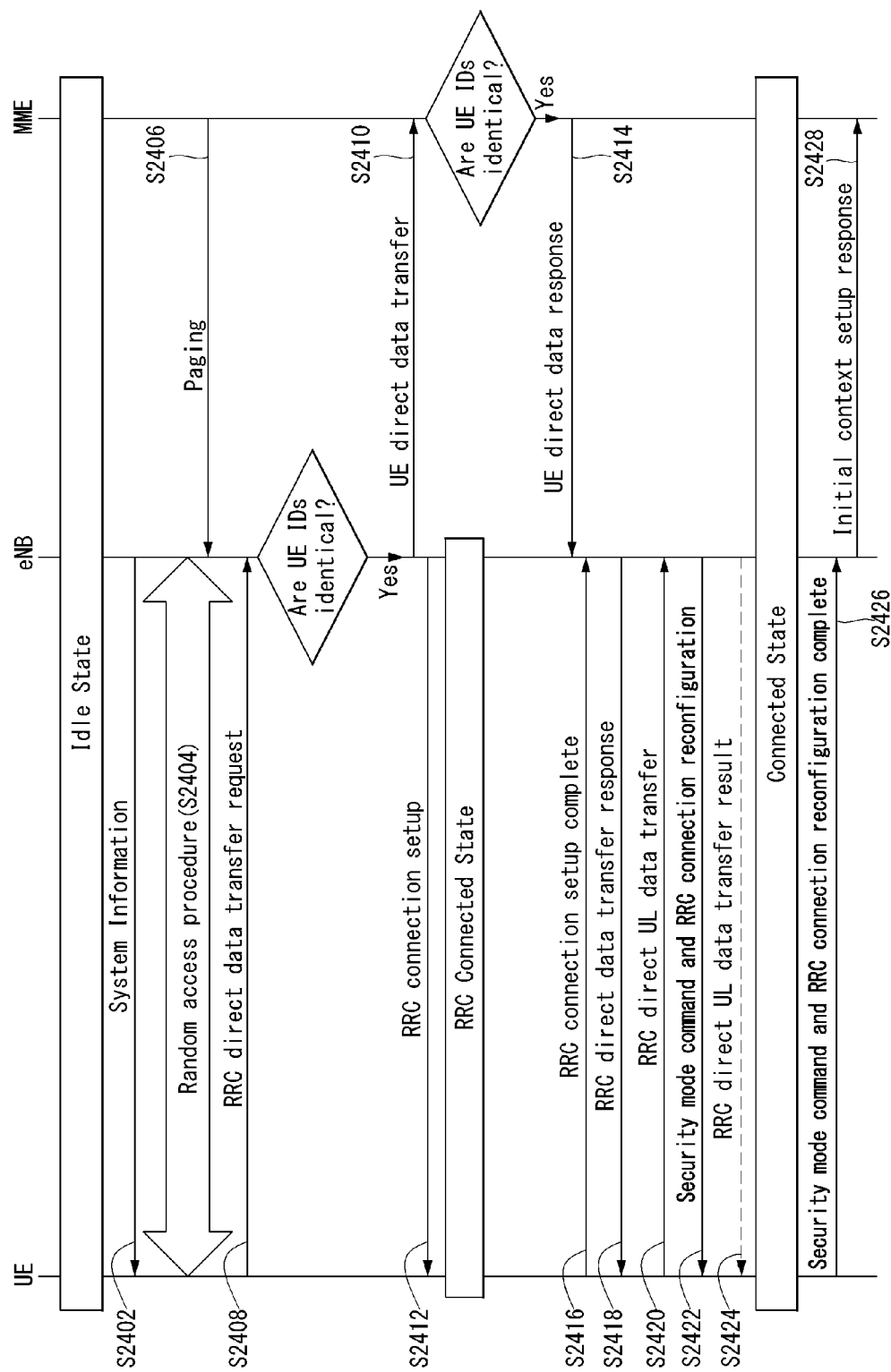
FIG. 24 is a flowchart showing another example in which a UE switches from the connectionless mode to the connection-oriented mode by an eNB to which the present invention may be applied.

FIG. 24 is a flowchart showing another example in which a UE switches from the connectionless mode to the connection-oriented mode by an eNB to which the present invention may be applied.

Referring to FIG. 24, if data is transmitted on a connectionless basis after the integrity of a UE is verified, the UE in the connectionless mode of the idle state may be made to switch to the connection-oriented mode of the connected state by an eNB.

First, step S2402 to step S2404 are the same as step S2202 to step S2204 of FIG. 22, and thus a description thereof is omitted.

Thereafter, the eNB may receive a paging message from an MME (S2406). The paging message may include a UE ID IE field including a UE ID indicative of a UE on which the eNB may perform a connection procedure.

The UE transmits an RRC Direct Data Transfer Request message to the eNB for a data transmission request (S2408).

The RRC direct transfer request message may include a UE ID IE field indicative of a message type and/or a UE ID, a Tx indicator indicating whether the request message is a request for data transmission, and a direct data NAS IE field, that is, a message that needs to be transmitted to the MME.

The UE ID IE field may include an MME identifier that manages the UE and an identifier that identifies the UE within the corresponding MME. More specifically, the UE ID IE field may include at least one of a public land mobile network identifier (PLMN ID) that is an operator network identification number, an MME group identifier (MMEGI) that is an MME group identifier, MME code (MMEC)

indicative of an MME code ID, an M-TMSI that is a UE ID, a parameter indicative of an identifier allocated by an MME supporting which communication technology, and a parameter indicative of an identifier allocated by another entity other than the MME.

The Tx indicator field may indicate whether the RRC direct data transmission request is a request for receiving data or a request for transmitting data. For example, if a value of the Tx indicator is "1", it may indicate a data transmission request. If a value of the Tx indicator is "0", it may indicate a request for data reception.

If the RRC Direct Data Transfer Request message indicates a data transmission request, the direct data NAS IE field may include a Security IE field for determining the integrity of the UE and/or a QoS IE field indicative of the characteristics of data to be transmitted.

The Security IE field is the same as that described in FIG. 16. The QoS IE field may include an EPS bearer ID corresponding to data to be transmitted by the UE and a Direct Data Size field indicative of the size of the data.

The eNB may compared the UE ID of the UE ID IE field within the paging message transmitted by the MME with the UE ID of the UE ID IE field of the RRC Direct Data Transfer Request message transmitted by the UE.

If, as a result of the comparison, the UE IDs are the same, the eNB performs a procedure for RRC connection setup.

In order to perform a data transmission and connection setup procedure with the UE, the eNB may include information, included in the UE ID IE field and the direct data NAS IE field received from the UE, in a UE Direct Data Transfer message, and may transmit the message to the MME (S2410).

The MME may compare a UE ID owned by the MME with the UE ID included in the UE IE ID field received from the eNB. If, as a result of the comparison, the UE IDs are the same, the MME may include information necessary for the security configuration and data path configuration for the UE in a UE direct data response message of step S2414, and may transmit the response message.

However, if the UE IDs are not the same, the MME may not transmit information necessary for the security configuration and data path configuration for the UE.

Step S2412 to step S2428 are the same as step S2210 to step S2226 of FIG. 22, and thus a description thereof is omitted.

Figure 25:
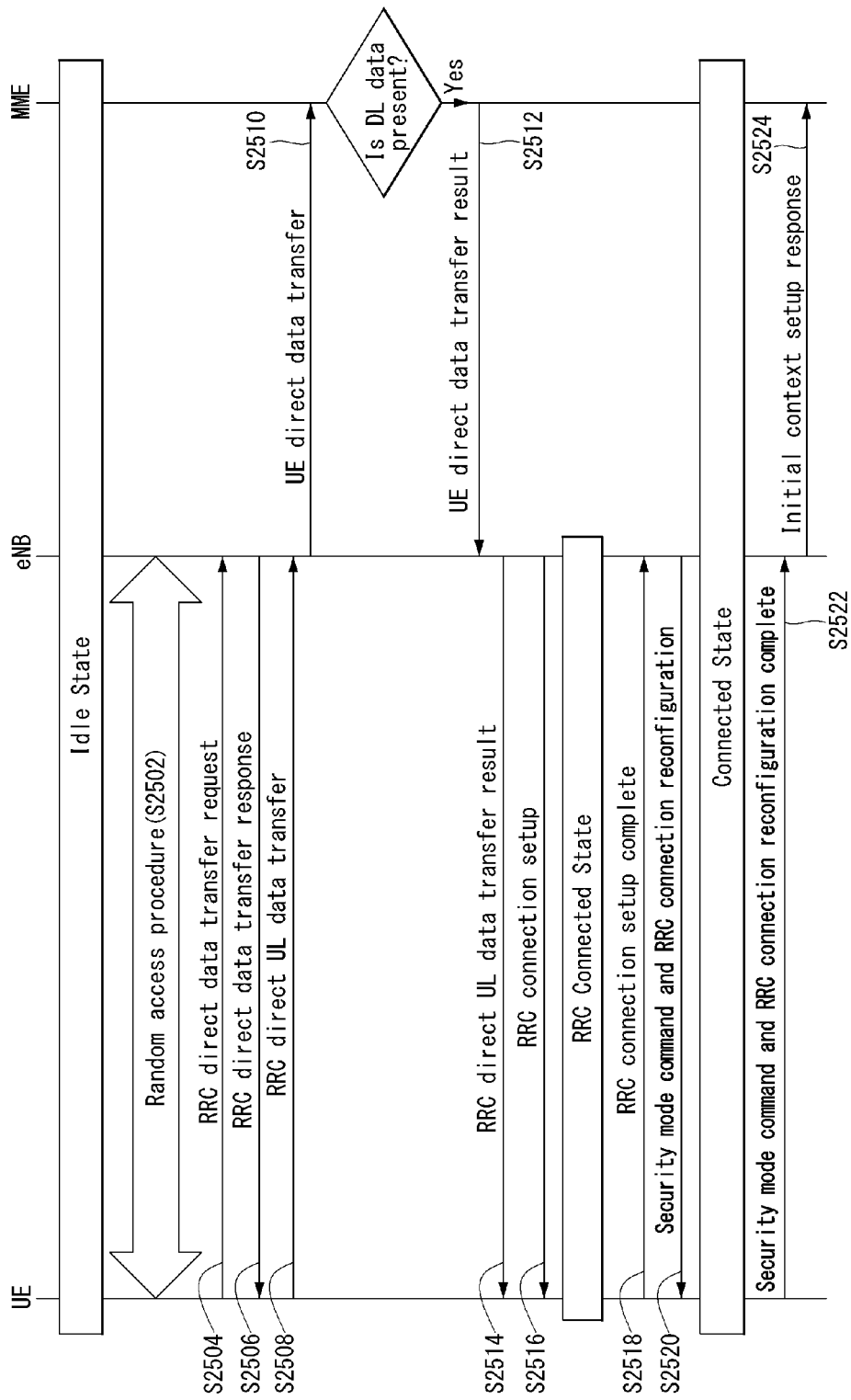
FIG. 25 is a flowchart showing an example in which a UE switches from the connectionless mode to the connection-oriented mode by a mobility management entity (MME) to which the present invention may be applied.

FIG. 25 is a flowchart showing an example in which a UE switches from the connectionless mode to the connection-oriented mode by a mobility management entity (MME) to which the present invention may be applied.

Referring to FIG. 25, if DL data is generated while data is transmitted on a connectionless basis before the integrity of a UE is verified, the UE may be made to switch to the connection-oriented mode of the connected state.

First, step S2502 to step S2510 are the same as step S1602 to step S1610 of FIG. 16, and thus a description thereof is omitted.

If data to be transmitted to the UE is generated due to the cause described in FIG. 17 after the MME transmits the data of the UE to a gateway, the UE needs to switch to the connection-oriented mode of the connected state in order to transmit the data.

Accordingly, the MME may request the ECM and data connection setup of the UE from the eNB by transmitting a UE Direct Data Transfer Result message (or result message), including the results of the transmission of the data of the UE and a UE Context Setup Request IE field, to the eNB (S2512).

The UE context setup request IE field may include one or more of a context setup request indicator indicating whether ECM and data connection setup have been requested, and information (e.g., a UE aggregate Maximum Bit Rate or an E-RAB) related to a data connection and information (UE Security Capabilities, Security Key) related to a security configuration, such as those of Table 4.

The eNB may notify the UE of the results of the data transmission of the UE received from the MME through an RRC Direct UL Data Transfer Result message (or result message) (S2514), and may transmit an RRC connection setup message to the UE in order to perform an RRC connection procedure with the UE (S2516).

After the UE switches to the RRC connected state, it may transmit an RRC Connection Setup Complete message to the eNB (S2518).

Thereafter, the eNB may transmit a Security Mode Command & RRC Connection Reconfiguration message to the UE for the security configuration and the data connection setup (S2520), and may configure security for a radio link, an SRB2 and a data connection through the context information of the UE received from the MME.

Thereafter, the UE switches to the connection-oriented mode of the connected state and transmits a Security Mode Command & RRC Connection Reconfiguration Complete message to the eNB (S2522). The eNB may transmit a response (e.g., an initial context setup response message) to the ECM and data connection setup request to the MME (S2524).

Through such a method, when DL data is generated, the UE switches from the connectionless mode of the idle state to the connection-oriented mode of the connected state in response to a request from the MME and is capable of data transmission and reception.

Figure 26:
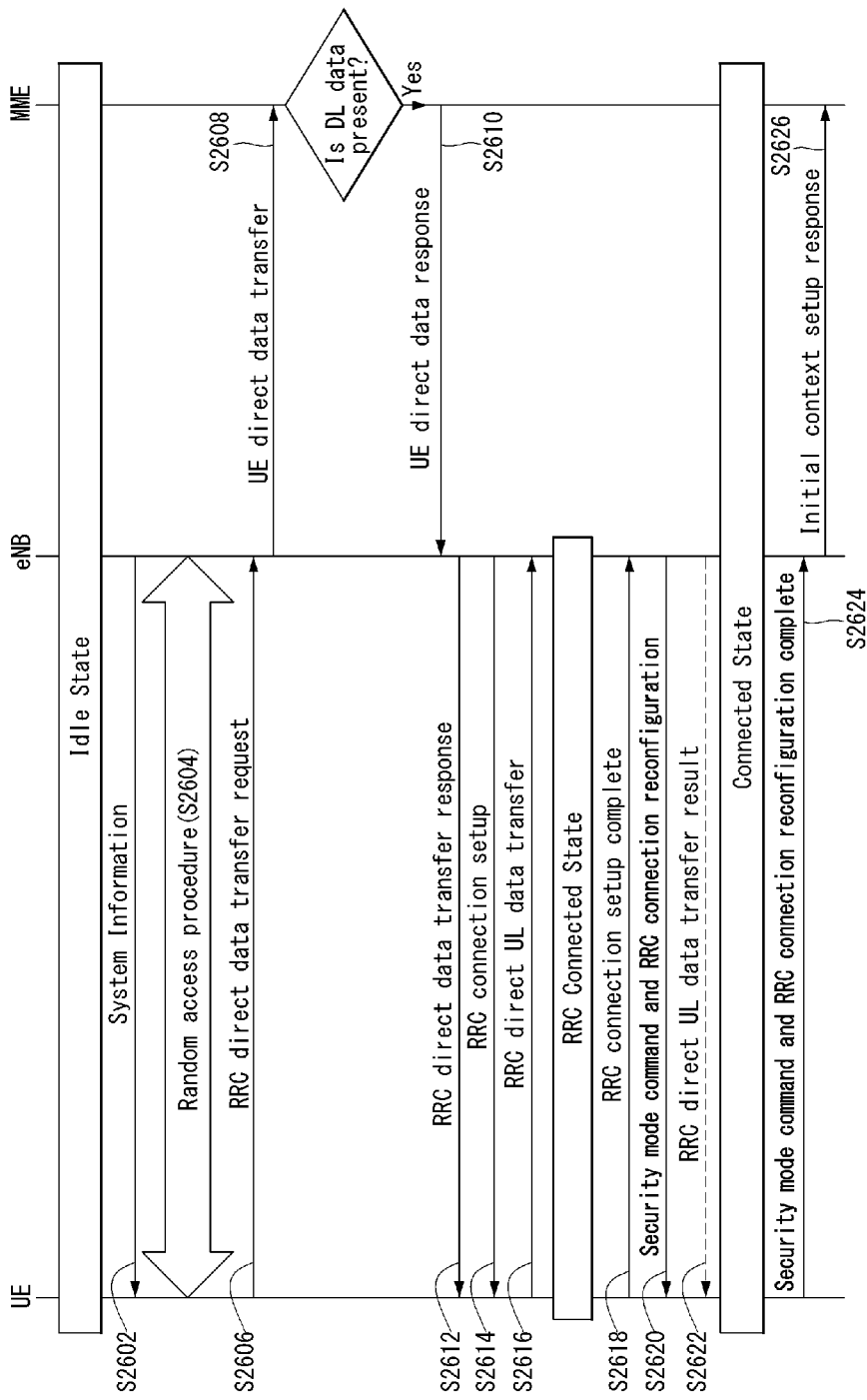
FIG. 26 is a flowchart showing another example in which a UE switches from the connectionless mode to the connection-oriented mode by a mobility management entity (MME) to which the present invention may be applied.

FIG. 26 is a flowchart showing another example in which a UE switches from the connectionless mode to the connection-oriented mode by a mobility management entity (MME) to which the present invention may be applied.

When DL data is generated while data is transmitted on a connectionless basis after the integrity of a UE is verified, the UE may be made to switch to the connection-oriented mode of the connected state.

First, step S2602 and step S2604 of FIG. 26 are the same as step S2202 and step S2204 of FIG. 22, and thus a description thereof is omitted.

The UE transmits an RRC Direct Data Transfer Request message to the eNB in order to request data for low latency service in the connectionless mode described in FIG. 15 (S2606).

The RRC direct transfer request message may include a UE ID IE field indicative of a message type and/or a UE ID, a Tx indicator indicating whether the request message is a request for data transmission, and a direct data NAS IE field, that is, a message that needs to be transmitted to an MME.

The UE ID IE field may include an MME identifier that manages the UE and an identifier that identifies the UE within the corresponding MME. More specifically, the UE ID IE field may include at least one of a public land mobile network identifier (PLMN ID) that is an operator network identification number, an MME group identifier (MMEGI) that is an MME group identifier, MME code (MMEC) indicative of an MME code ID, an M-TMSI that is a UE ID, a parameter indicative of an identifier allocated by an MME supporting which communication technology, and a parameter indicative of an identifier allocated by another entity other than the MME.

The Tx indicator field may indicate whether the RRC direct data transmission request is a request for receiving data or a request for transmitting data. For example, if a value of the Tx indicator is "1", it may indicate a data transmission request. If a value of the Tx indicator is "0", it may indicate a request for data reception.

If the RRC Direct Data Transfer Request message indicates a data transmission request, the direct data NAS IE field may include a Security IE field for determining the integrity of the UE and/or a QoS IE field indicative of the characteristics of data to be transmitted.

The Security IE field is the same as that described in FIG. 16. The QoS IE field may include an EPS bearer ID corresponding to data to be transmitted by the UE and a Direct Data Size field indicative of the size of the data.

In order to notify the MME that there is a data transmission request from the UE, the eNB may include information, included in the UE ID IE field and direct data NAS IE field received from the UE, in a UE Direct Data Transfer message, and may transmit the message to the MME (S2608).

Thereafter, if there is data to be transmitted to the UE due to the cause described in FIG. 17, the UE needs to switch to the connection-oriented mode of the connected state in order to transmit the data.

The MME performs an integrity check on the UE based on information included in the Security IE field of the received UE Direct Data Transfer message If the UE is valid, the MME may request the ECM and data connection setup of the UE from the eNB by transmitting a UE direct data response message, including the security-related information, data-related information corresponding to the EPS bearer ID of the data to be transmitted by the UE, and a UE Context Setup Request IE field, to the eNB through the UE direct data response message (S2610).

The UE context setup request IE field may include one or more of a context setup request indicator indicating whether ECM and data connection setup have been requested, and information (e.g., a UE aggregate Maximum Bit Rate or an E-RAB) related to a data connection and information (UE Security Capabilities, Security Key) related to the security configuration, such as those of Table 4.

The security-related information may include a ciphering algorithm supported by the UE, an integrity guarantee algorithm supported by the UE, and a default key (e.g., $K_{eNB}$) for generating keys to be used for ciphering and integrity guarantee purposes by the AS.

The data-related information corresponding to the EPS bearer ID of the data to be transmitted by the UE may include an EPS bearer ID, QoS, size information of the data to be transmitted, and the address and tunnel ID of a gateway to which the data will be forwarded.

If the security algorithm is selected according to a predetermined rule as described above, the UE and the eNB can be aware that which algorithm will be used because the eNB can receive the ciphering and integrity guarantee algorithms supported by the UE from the MME.

If the UE is not valid, the MME includes a field indicative of an invalid cause in the UE direct data response message, and transmits the response message to the eNB.

If the eNB receives the UE direct data response message indicating that the UE is valid from the MME, the eNB may determine a resource allocation time and a resource allocation size according to data transmission urgency of QoS (e.g., the aforementioned QCI or direct data size) corresponding to the EPD Bearer ID of the data to be transmitted by the UE. The eNB includes an UL resource IE indicative of corresponding resource allocation information in an RRC Direct Data Transfer Response message (or response message), and transmits the response message to the UE (S2612).

In this case, since a plurality of UEs may select the same resources and random access code (or preamble) in the random access process, the response message may include a target UE ID IE field indicating that the allocated resources have been allocated to which UE.

The target UE ID IE field may include one or more fields including the UE ID IE received at step S2606, and may have the data format of Table 3.

Thereafter, in order to perform an RRC connection procedure with the UE, the eNB transmits an RRC connection setup message to the UE (S2614). The UE transmits an RRC Direct UL Data Transfer message (or transfer message) to the eNB through the allocated resources (S2616).

The RRC Direct UL Data Transfer message may include a direct data IE field, that is, data to be transmitted to a gateway.

The eNB determines whether or not to transmit the data to the gateway by decoding the RRC Direct UL Data Transfer message and checking integrity.

That is, if the message is normal, the eNB transmits the data to a gateway corresponding to the EPS bearer ID of the data. The UE may switch to the RRC connected state and transmit an RRC Connection Setup Complete message to the eNB (S2618).

Thereafter, the eNB transmits a Security Mode Command & RRC Connection Reconfiguration message to the UE for a security configuration and data connection setup (S2620), and may configure security for a radio link, an SRB2 and a data connection through the context information of the UE received from the MME.

The eNB may notify the UE that the data has been transmitted through an RRC Direct UL Data Transfer Result message (or result message) (S2622). The UE may switch to the connection-oriented mode.

Step S2624 and step S2626 are the same as step S2224 and step S2226 of FIG. 23, and a description thereof is omitted.

Figure 27:
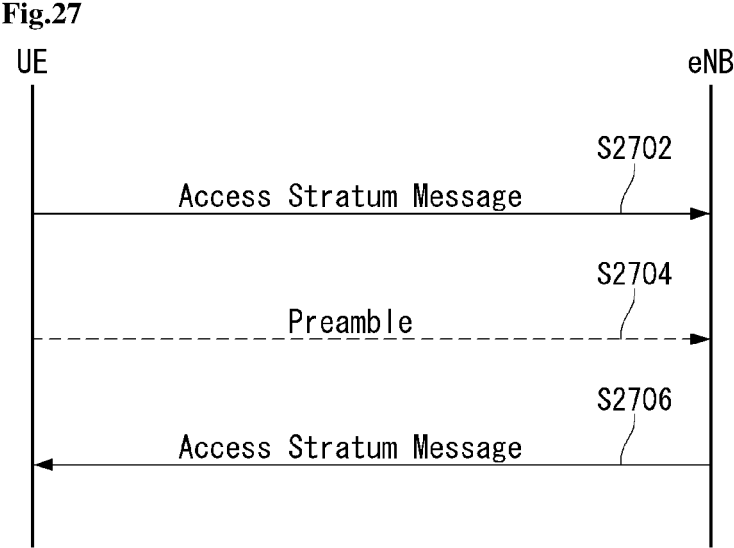
FIG. 27 is a flowchart showing an example of the UL synchronization procedure of a UE to which the present invention may be applied.

FIG. 27 is a flowchart showing an example of the UL synchronization procedure of a UE to which the present invention may be applied.

Referring to FIG. 27, the eNB may transmit an AS (e.g., access stratum—RRC/RLC/MAC) message, for example, information for the UL synchronization of the UE that has transmitted the RRC direct data transmission request described in FIG. 19, to the corresponding UE without the intervention of the random access procedure in FIG. 20.

Specifically, the UE may transmit an AS message, such as the RRC Direct Data Transfer Request message of FIG. 20, to the eNB (S2702), and may additionally transmit a preamble for UL synchronization (S2704).

The eNB may estimate a timing advance (TA) value through the AS message transmitted by the UE or the additionally transmitted preamble. The estimated TA value is included in an access stratum (AS) message to be transmitted to the corresponding UE and transmitted to the UE (S2706).

In this case, the preamble may be transmitted simultaneously with the AS message of step S2702. Through such a method, although a random access procedure is not performed, the UE can be UL synchronized.

Figure 28:
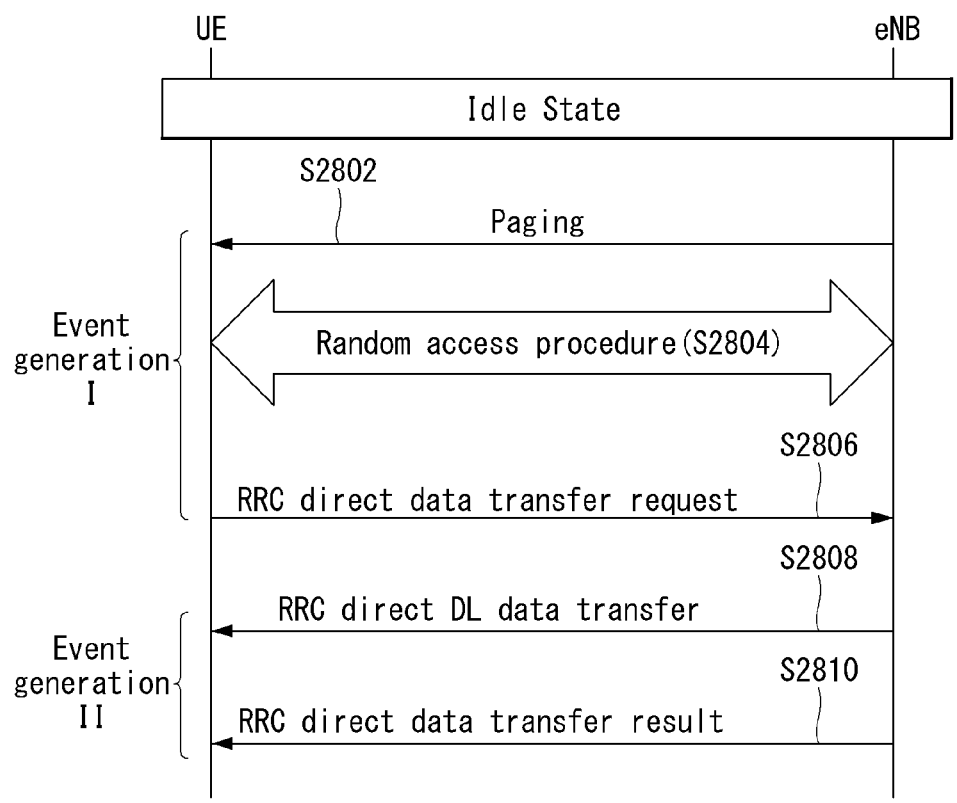
FIG. 28 is a flowchart showing an example in which the connectionless mode switches from the connection-oriented mode based on a point of time at which transmission and reception data is generated to which the present invention may be applied.

FIG. 28 is a flowchart showing an example in which the connectionless mode switches from the connection-oriented mode based on a point of time at which transmission and reception data is generated to which the present invention may be applied.

Referring to FIG. 28, a UE that has received a paging message may determine whether or not to transmit an RRC message including a request for transition to the connection-oriented mode of the connected state in response to a point of time at which a subsequently event is generated (UL data generation or subsequent data generation prediction).

Specifically, the UE may receive the paging message that wakes up the UE from an eNB (S2802). After receiving the paging message, the UE in which the event was generated may perform a random access procedure with the eNB (S2804). In order to request transition to the connection-oriented mode from the eNB, the UE may transmit the RRC Direct Data Transfer Request message described in FIGS. 20 to 22 (S2806, event generation I).

Alternatively, if the event is generated after the RRC Direct Data Transfer Request message for DL data reception is transmitted, the UE may receive data through an RRC direct DL Transfer message from the eNB (S2808), and may request the results of DL data transmission and transition to the connection-oriented mode through an RRC direct data transfer result message (or result message) (S2810, event generation II).

In this case, the RRC direct data transfer result message may include the aforementioned Mode Transition IE field.

Figure 29:
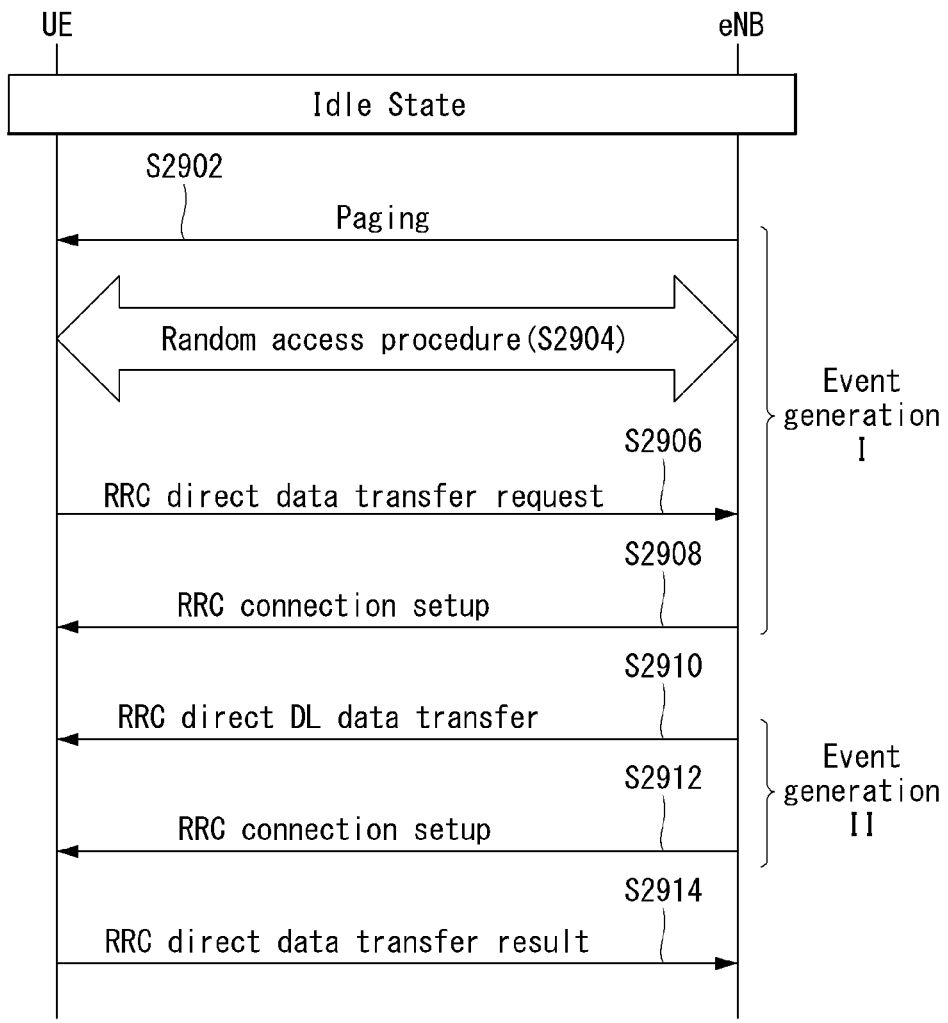
FIG. 29 is a flowchart showing another example in which the connectionless mode switches to the connection-oriented mode based on a point of time at which transmission and reception data is generated to which the present invention may be applied.

FIG. 29 is a flowchart showing another example in which the connectionless mode switches to the connection-oriented mode based on a point of time at which transmission and reception data is generated to which the present invention may be applied.

Referring to FIG. 29, an eNB may perform a procedure for transition to the connection-oriented mode of the connected state in response to a point of time of an event (DL data generation) generated after a paging message is transmitted.

Specifically, a UE may receive a paging message that wakes up the UE from an eNB (S2902). The UE that has received the paging message may perform a random access procedure with the eNB for DL data transmission and reception (S2904), and may transmit an RRC Direct Data Transfer Request message (S2906, event generation I).

Thereafter, the eNB may transmit a connection setup message to the UE in order to perform an RRC connection setup procedure with the UE (S2908).

Alternatively, when data to be transmitted to the UE is generated after receiving an RRC Direct Data Transfer Request message for DL data reception, the eNB may transmit the data to the UE through an RRC direct DL data Transfer message (S2910). In order to perform an RRC connection procedure, the eNB may transmit an RRC connection setup message to the UE (S2912).

Thereafter, the UE may notify the results of the DL data transmission to the eNB through an RRC direct data transfer result message (or result message) (S2914).

Figure 30:
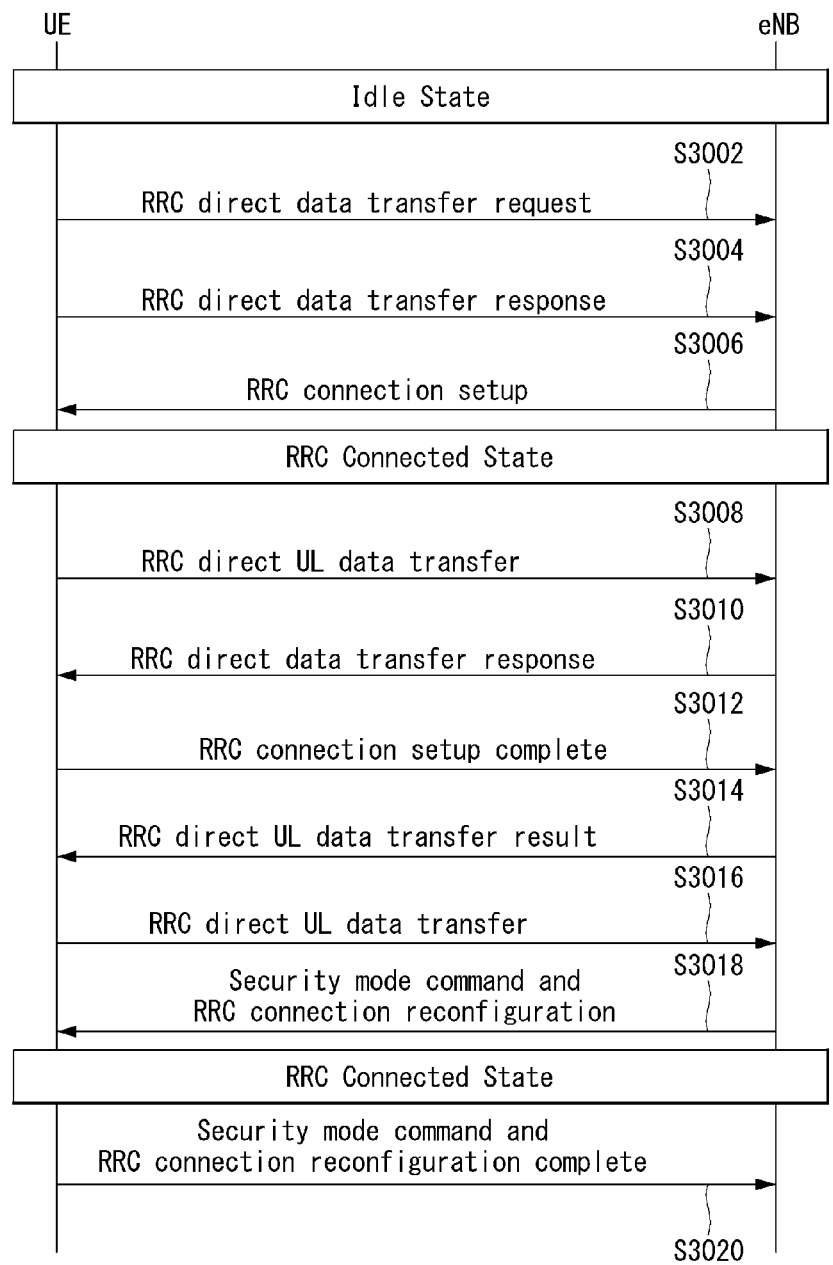
FIG. 30 is a flowchart showing an example in which low latency data is transmitted and received in a transition process from the connectionless mode to the connection-oriented mode.

FIG. 30 is a flowchart showing an example in which low latency data is transmitted and received in a transition process from the connectionless mode to the connection-oriented mode.

Referring to FIG. 30, when data is generated while a UE performs a transition procedure to the connection mode of the connected state for transmission and reception in the idle state, the UE may continue to perform the connectionless-based data transmission and reception procedure.

Specifically, in order to perform a transition procedure to the connection-oriented mode, a UE may transmit the RRC Direct Data Transfer Request message described in FIGS. 20 to 22 to the eNB (S3002).

Thereafter, the UE may receive the RRC Direct Data Transfer Response message described in FIGS. 20 to 22 from an eNB as a response to the RRC direct data transmission request message (S3004), and may receive an RRC connection setup message in order to perform an RRC connection procedure with the eNB (S3006).

The UE that has received the RRC connection setup message may switch to the RRC connected state.

Thereafter, the UE may transmit an RRC Direct UL Data Transfer message through allocated resources (S3008). The RRC Direct UL Data Transfer message may include the QoS IE field described in FIG. 16 and a Data IE field including first data to be transmitted.

In this case, the QoS IE field includes a QoS IE for second data to be subsequently transmitted other than the QoS IE for the first data.

By transmitting the QoS IE for the second data to the eNB, the UE can request UL resources for transmitting the second data from the eNB.

If the UE has physical resources for requesting UL resources (e.g., a scheduling request), the UE may request the UL resources from the eNB through the corresponding resources.

Thereafter, the UE may receive an RRC Direct Data Transfer Response message as a response to a resource request for the second data transmission (S3010), and may transmit an RRC Connection Setup Complete message to the eNB (S3012).

The eNB may include the results of the transmission of the first data in an RRC Direct UL Data Transfer Result message (or result message), and may notify the UE of the result message (S3014).

The UE may transmit an RRC Direct UL Data Transfer message, including the second data, to the eNB through the resources allocated through step S3010 (S3016), and may receive a Security Mode Command & RRC Connection Reconfiguration message for a security configuration and data connection setup from the eNB (S3018). The eNB may configure security for a radio link, an SRB2 and a data connection through the context information of the UE received from the MME through the Security Mode Command & RRC Connection Reconfiguration message.

Thereafter, the UE switches to the connection-oriented mode of the connected state, and may transmit a Security Mode Command & RRC Connection Reconfiguration Complete message to the eNB (S3020).

Figure 31:
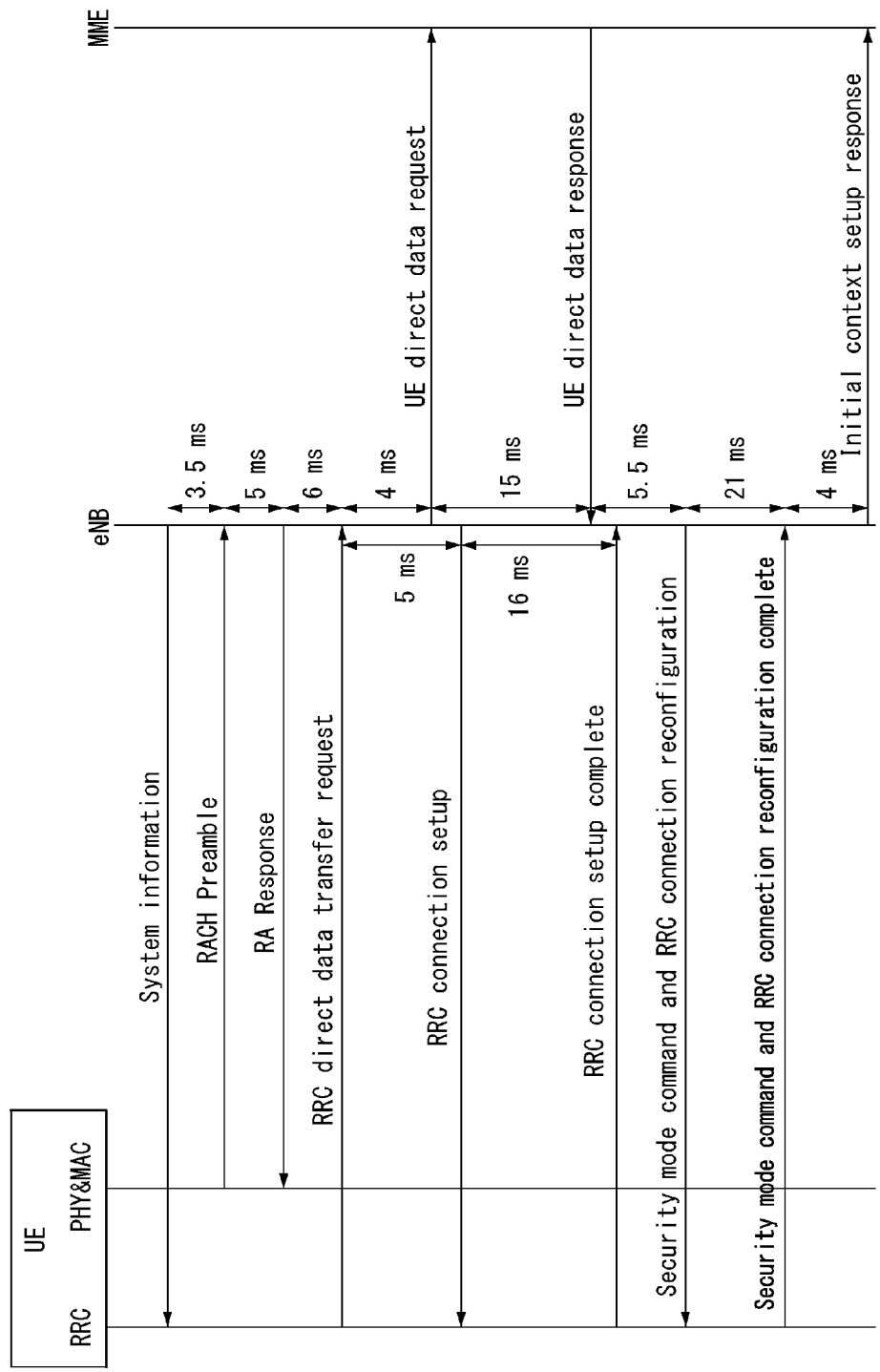
FIGS. 31 and 32 are diagrams showing examples of the time taken to switch to the connection-oriented mode according to the present invention.
Figure 32:
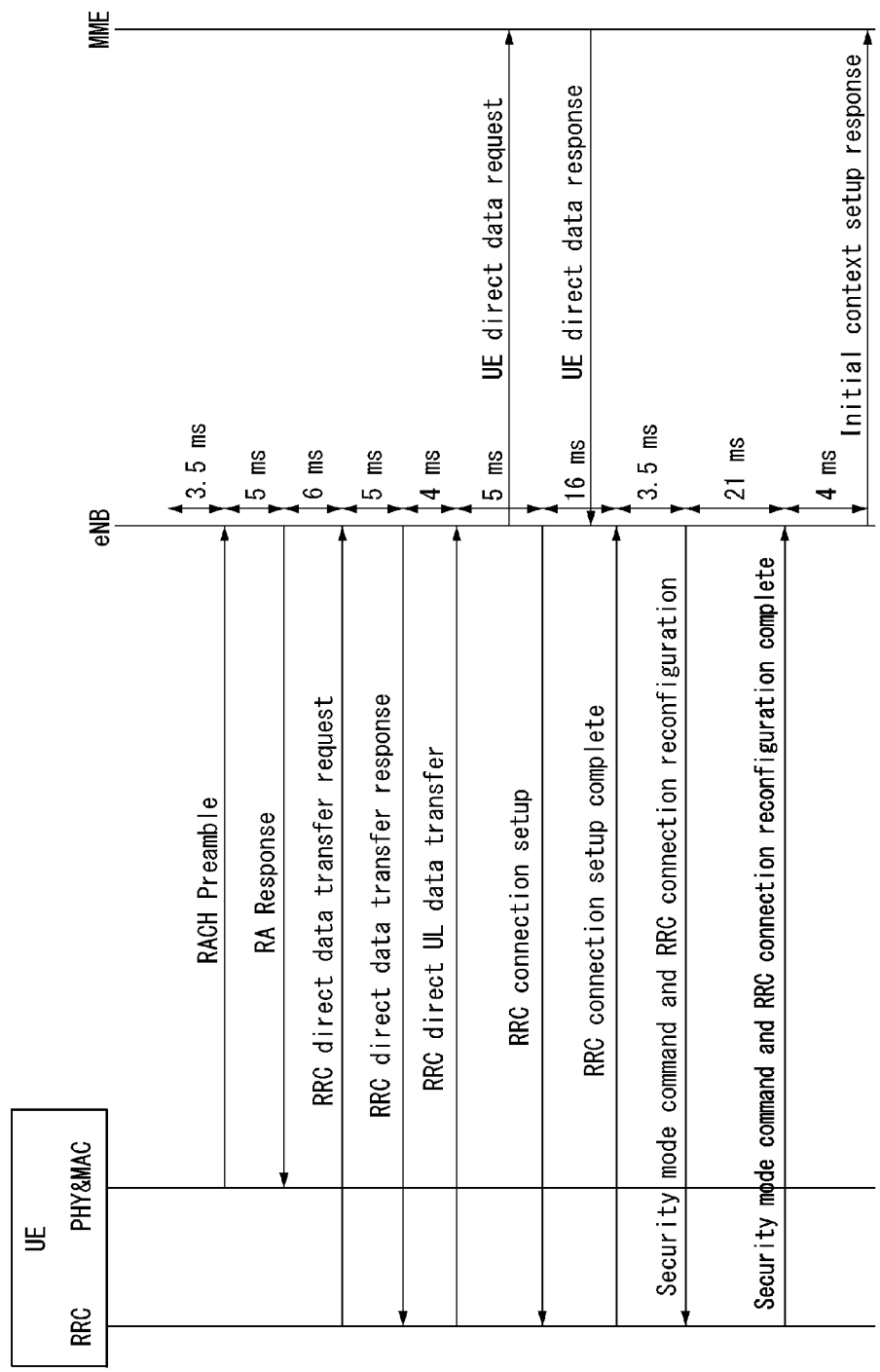

FIGS. 31 and 32 are diagrams showing examples of the time taken to switch to the connection-oriented mode according to the present invention. FIG. 31 is a diagram showing the time taken to switch to the connection-oriented mode if data is transmitted after the integrity verification of a UE, and FIG. 32 is a diagram showing the time taken to switch to the connection-oriented mode if data is transmitted prior to the integrity verification of a UE.

A shown in FIGS. 31 and 32, if a UE switches from the idle state to the connected state using the method proposed by the present invention, there are effects in that signaling overhead can be reduced and the connected state and mode transition time can be reduced.

Specifically, it is not necessary to transmit a paging message and a random access procedure may not be performed. Furthermore, a state and mode transition time can be reduced because an operation is possible regardless of a paging cycle and connectionless-based data transmission and reception and the integrity verification procedure of a UE are performed at the same time.

As shown in FIG. 31, if data is transmitted after the integrity verification of a UE, the time taken to switch to the connection-oriented mode is 64 ms. As shown FIG. 32, if data is transmitted prior to the integrity verification of a UE, the time taken to switch to the connection-oriented mode is 73 ms.

Table 5 is a table in which examples of times taken to switch from the idle state to the connected state according to the present invention are compared.

(TTI=1 ms, eNB scheduling delay=0, the number of RACHs=1, Idle-DRX Cycle=320 ms, and a backhaul transmission time not included)

TABLE 5

Figure 33:
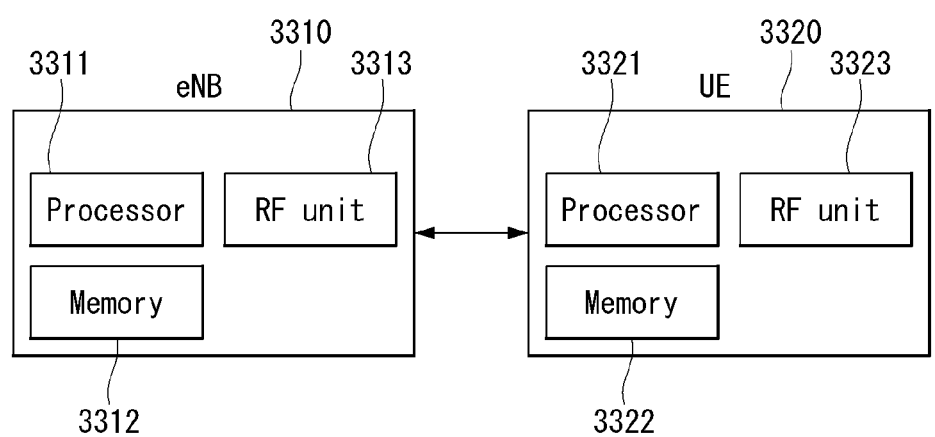
FIG. 33 is a diagram showing an example of the internal block diagram of a wireless apparatus to which the present invention may be applied.

| Connection method | | | Required connected state transition time |
|---|---|---|---|
| Connected state transition by UE | Conventional method | | 88.5 ms (85 + 3.5 ms) |
| | Proposed method | Method of FIG. 33 | 73 ms |
| | | Method of FIG. 32 | 64 ms |
| Connected state transition by eNB | Conventional method | | 245 ms (85 + 320 ms/2) |
| | Proposed method | Method of FIG. 24 | 73 ms |
| | | Method of FIG. 25 | 64 ms |

FIG. 33 is a diagram showing an example of the internal block diagram of a wireless apparatus to which the present invention may be applied.

In this case, the wireless apparatus may be an eNB and a UE. The eNB includes both a macro eNB and a small eNB.

As shown in FIG. 33, the eNB 3310 and a UE 3320 include communication units (transmission and reception units, RF units) 3313 and 3323, processors 3311 and 3321, and memory 3312 and 3322, respectively.

In addition, each of the eNB and UE may further include an input unit and an output unit.

The communication unit 3313, 3323, the processor 3311, 3321, the input units, the output units, and the memory 3312, 3322 are functionally connected in order to perform the method proposed by this specification.

When the communication unit (transmission and reception unit or RF unit) 3313, 3323 receives information generated by a physical layer (PHY) protocol, it moves the received information to a radio-frequency (RF) spectrum, performs filtering and amplification on the information, and transmits the information to an antenna. Furthermore, the communication unit functions to move a radio frequency (RF) signal, received by the antenna, to a band capable of being processed in the PHY protocol and to perform filtering.

Furthermore, the communication unit may include a switch function for switching such transmission and reception functions.

The processor 3311, 3321 implements the functions, processes and/or methods proposed by this specification. The layers of a radio interface protocol may be implemented by the processor.

The processor may also be expressed as a control unit, a controller, a control unit or a computer.

The memory 3312, 3322 is connected to the processor and stores a protocol or parameter for performing an UL resource allocation method.

The processor 3311, 3321 may include application-specific integrated circuits (ASICs), other chipsets, logic circuits and/or data processors. The memory may include read-only memory (ROM), random access memory (RAM), flash memory, a memory card, a storage medium and/or other storage devices. The communication unit may include a baseband circuit for processing a radio signal. When an embodiment is implemented in software, the aforementioned scheme may be implemented by a module (process, function, etc.) that performs the aforementioned function.

The module may be stored in the memory and executed by the processor. The memory may be located inside or outside the processor and connected to the processor by well-known means.

The output unit (display unit or indication unit) is controlled by the processor and outputs information output by the processor along with a key input signal generated by the input unit and a variety of types of information signals from the processor.

The present invention described above may be substituted, modified and changed by a person having ordinary skill in the art to which the present invention pertains without departing from the technological spirit of the present invention, and thus is not restricted by the aforementioned embodiments and the accompanying drawings.

INDUSTRIAL APPLICABILITY

The RRC connection methods in the wireless communication system of the present invention have been described based on the examples in which they are applied to the 3GPP LTE/LTE-A systems, but may also be applied to various wireless communication systems in addition to the 3GPP LTE/LTE-A systems.

The invention claimed is:

1. A method for transmitting and receiving data in a wireless communication system supporting low latency service, the method performed by a terminal comprising:
transmitting, to a base station, a request message for switching from an idle state to a connected state,
wherein the idle state is divided into a first mode incapable of data transmission and reception and a second mode capable of low latency service data transmission and reception,
wherein the request message includes a mode transition information element (IE) field requesting transition to the connected state and a UE ID IE field indicative of the UE, and wherein the base station compares a UE ID of a UE ID IE field within a paging message transmitted by a mobility management entity (MME) with a UE ID of the UE ID IE field within the request message;
based on a result of the comparison, receiving a response message including resource information related to a transmission and reception of the low latency service data in response to the request message from the base station;
transmitting or receiving a transfer message including the low latency service data to or from the base station based on the response message; switching from the idle state to the connected state; and
transmitting or receiving additional data related to the low latency service data to or from the base station in the connected state,
wherein the low latency service data is transmitted or received to or from the base station in the second mode of the idle state, wherein the request message further includes a Tx indicator field indicative of the transmission or reception of the low latency service data, and when the Tx indicator indicates the transmission of the low latency service data, the request message further includes a quality of service information element (QoS IE) field indicating characteristics of the low latency service data.

2. The method of claim 1, wherein the UE ID IE field comprises at least one of an MME temporary mobile subscriber identity (T-TMSI) indicative of a UE ID, a public land mobile network identifier (PLMN ID) indicative of an operator network ID number, an MME group identifier (MMEGI) indicative of an MME group identifier or MME code (MMEC) indicative of an MME code ID.

3. The method of claim 1, wherein the mode transition information element (IE) field includes at least one of a mode transition indicator indicating whether the request message is a message requesting transition to the connected state or a mode transition cause field indicative of a transition request cause to the connected state.

4. The method of claim 1, wherein the resource information comprises at least one of an uplink (UL) resource IE field indicative of UL resources for the transmission of the low latency service data or a target ID IE field indicating that the UL resources have been allocated to the terminal.

5. The method of claim 1, wherein the request message or the transfer message further includes a security information element (IE) field indicative of information related to security.

6. The method of claim 1, wherein the request message and the transfer message are together transmitted.

7. The method of claim 1, wherein the step of switching comprises:
receiving an RRC connection setup message for transition to the connected state from the base station;
transmitting an RRC connection setup complete message to the base station after switching to an RRC connected state based on the RRC connection setup message; and
performing security and data connection setup with the base station.

8. A method for transmitting and receiving data in a wireless communication system supporting low latency service, the method performed by a base station comprising steps of:
receiving a request message for switching from an idle state to a connected state from a terminal,
wherein the idle state is divided into a first mode incapable of data transmission and reception and a second mode capable of low latency service data transmission and reception, and
wherein the request message includes a mode transition information element (IE) field requesting transition to the connected state and a UE ID IE field indicative of the UE;
comparing a UE ID of the UE ID IE field within a paging message transmitted by a mobility management entity (MME) with a UE ID of the UE ID IE field within the request message;
based on a result of the comparison, transmitting a response message including resource information related to a transmission and reception of low latency service data to the terminal in response to the request message; and
determining whether or not to transmit or receive the low latency service data, wherein the request message further includes a Tx indicator field indicative of the transmission or reception of the low latency service data, and if the Tx indicator indicates the transmission of the low latency service data, the request message further includes a quality of service information element (QoS IE) field indicating characteristics of the low latency service data.

9. The method of claim 8, wherein the UE ID IE field comprises at least one of an MME temporary mobile subscriber identity (T-TMSI) indicative of a UE ID, a public land mobile network identifier (PLMN ID) indicative of an operator network ID number, an MME group identifier (MMEGI) indicative of an MME group identifier or MME code (MMEC) indicative of an MME code ID.

10. The method of claim 8, wherein the mode transition information element (IE) field includes at least one of a mode transition indicator indicating whether the request message is a message requesting transition to the connected state or a mode transition cause field indicative of a transition request cause to the connected state.

11. The method of claim 8, wherein the resource information comprises at least one of an uplink (UL) resource IE field indicative of UL resources for the transmission of the low latency service data or a target ID IE field indicating that the UL resources have been allocated to the terminal.

12. The method of claim 8, wherein the request message or the transfer message further includes a security information element (IE) field indicative of information related to security.

13. The method of claim 8, wherein the step of determining comprises steps of: determining integrity of the terminal; transmitting or receiving a transfer message including the mode transition information element (IE) field and the low latency service data to or from the mobility management entity (MME); receiving a result message including transmission information indicating whether the low latency data has been transmitted and transition information related to the mode transition of the terminal from the mobility management entity (MME); performing security and data connection setup with the terminal; and transmitting or receiving additional data related to the low latency service data.

14. The method of claim 13, wherein: if the terminal is valid, the transmission information indicates that the low latency service data has been transmitted or received, the transition information comprises at least one of a context setup request indicator indicating whether the data connection setup has been permitted, connection setup information related to the data connection setup of the terminal, or security configuration information related to the security configuration of the terminal, and the integrity of the terminal is determined by the base station or the MME.

15. A terminal for forming a connection in a wireless communication system supporting low latency service, the terminal comprising:
a transmitter and receiver configured to transmit and receive a radio signal to or from a base station; and
a processor functionally coupled to the transmitter and receiver,
wherein the processor is configured to:
control the transmitter to transmit a request message for switching from an idle state to a connected state to a base station, wherein the idle state is divided into a first mode incapable of data transmission and reception and a second mode capable of low latency service data transmission and reception,
wherein the request message includes a mode transition information element (IE) field requesting transition to the connected state and a UE ID IE field indicative of the UE, and wherein the base station compares a UE ID of a UE ID IE field within a paging message transmitted by a mobility management entity (MME) with a UE ID of the UE ID IE field within the request message, based on a result of the comparison, control the receiver to receive a response message including resource information related to a transmission and reception of the low latency service data in response to the request message from the base station, control the transmitter or receiver to transmit or receive a transfer message including the low latency service data to or from the base station based on the response message, switch from the idle state to the connected state; and control the transmitter or receiver to transmit or receive additional data related to the low latency service data to or from the base station in the connected state, wherein the low latency service data is transmitted or received to or from the base station in the second mode of the idle state, wherein the request message further includes a Tx indicator field indicative of the transmission or reception of the low latency service data, and if the Tx indicator indicates the transmission of the low latency service data, the request message further includes a quality of service information element (QoS IE) field indicating characteristics of the low latency service data.

16. A base station for forming a connection in a wireless communication system supporting low latency service, the base station comprising:

transmitter and receiver configured to transmit and receive a radio signal with a terminal; and a processor functionally coupled to the transmitter and receiver, wherein the processor is configured to:

control the receiver to receive a request message for switching from an idle state to a connected state from a terminal, wherein the idle state is divided into a first mode incapable of data transmission and reception and a second mode capable of low latency service data transmission and reception, and wherein the request message includes a mode transition information element (IE) field requesting transition to the connected state and a UE ID IE field indicative of the UE, compare a UE ID of the UE ID IE field within a paging message transmitted by a mobility management entity (MME) with a UE ID of the UE ID IE field within the request message, based on a result of the comparison, control the transmitter to transmit a response message including resource information related to a transmission and reception of low latency service data to the terminal in response to the request message, and determine whether or not to transmit or receive the low latency service data, wherein the request message further includes a Tx indicator field indicative of the transmission or reception of the low latency service data, and if the Tx indicator indicates the transmission of the low latency service data, the request message further includes a quality of service information element (QoS IE) field indicating characteristics of the low latency service data.

* * * * *